(12) United States Patent
Brown et al.

(10) Patent No.: US 10,258,021 B2
(45) Date of Patent: Apr. 16, 2019

(54) PET CLEANING APPARATUS

(71) Applicants: Andrew Brown, Williams Lake (CA);
 Jethro Bennett, Cambridge (GB)

(72) Inventors: Andrew Brown, Williams Lake (CA);
 Jethro Bennett, Cambridge (GB)

( * ) Notice: Subject to any disclaimer, the term of this patent is extended or adjusted under 35 U.S.C. 154(b) by 1656 days.

(21) Appl. No.: 13/891,232

(22) Filed: May 10, 2013

(65) Prior Publication Data
 US 2013/0305998 A1 Nov. 21, 2013

(30) Foreign Application Priority Data

May 15, 2012 (GB) .................................. 1208456.2
Jun. 12, 2012 (GB) .................................. 1210381.8

(51) Int. Cl.
 *A01K 13/00* (2006.01)
 *A46B 5/04* (2006.01)

(52) U.S. Cl.
 CPC .............. *A01K 13/001* (2013.01); *A46B 5/04* (2013.01)

(58) Field of Classification Search
 CPC ......... A01K 13/001; A46B 5/04; A46B 11/06; A41D 19/0079
 USPC ....... 119/603, 665, 650, 652, 600, 604, 632, 119/671, 677; 401/7; 15/34
 See application file for complete search history.

(56) References Cited

U.S. PATENT DOCUMENTS

| | | | | |
|---|---|---|---|---|
| 1,530,327 A | * | 3/1925 | Redlick | A47L 1/08 15/227 |
| 1,533,732 A | * | 4/1925 | Frost | A47L 13/18 239/529 |
| 3,701,604 A | * | 10/1972 | Holroyd | A41D 19/0079 401/204 |
| 5,649,502 A | * | 7/1997 | Frank | A01K 13/002 119/665 |
| 5,676,092 A | * | 10/1997 | Ortolivo | A01K 13/001 119/650 |
| 5,722,349 A | * | 3/1998 | Wolgamuth | A41D 19/0079 119/632 |
| 6,109,214 A | * | 8/2000 | Rampersad | A01K 13/002 119/600 |
| 6,718,913 B1 | * | 4/2004 | Stupar | A01K 13/002 119/602 |
| 6,948,451 B2 | * | 9/2005 | Bond | A01K 13/001 101/289 |
| 6,968,808 B2 | * | 11/2005 | Claire | A01K 13/001 119/652 |
| 7,347,166 B2 | * | 3/2008 | Roman-Barcelo | A01K 13/002 119/677 |
| 7,421,978 B2 | * | 9/2008 | Price | A01K 13/001 119/604 |

(Continued)

*Primary Examiner* — Yvonne R Abbott-Lewis

(57) ABSTRACT

A pet cleaning apparatus 10 comprises a portable lightweight self-contained pre-pressurizable fluid control and mix delivery station 12, a glove device 24 for outputting fluid, and a connecting member 26 for connecting the station 12 and the glove device 24, thus facilitating simultaneous petting, holding and cleaning of a pet with a single hand. Preferably pressurizing is achieved via a hand pump 32. Preferably the glove device 24 incorporates a pressure activated system, so that fluid is outputted when pressure is applied to a coat of a pet. Distance outputting may also be provided, thus providing multiple variable output options for a user.

23 Claims, 11 Drawing Sheets

(56) References Cited

U.S. PATENT DOCUMENTS

| | | | | |
|---|---|---|---|---|
| 8,286,592 | B2* | 10/2012 | Moinester | A01K 13/001 |
| | | | | 119/603 |
| 8,555,819 | B1* | 10/2013 | McFarland | A01K 13/001 |
| | | | | 119/603 |
| 8,794,189 | B1* | 8/2014 | Dahlquist | A46B 5/04 |
| | | | | 119/650 |
| 9,167,948 | B2* | 10/2015 | Tucker | A47L 13/19 |
| 9,326,484 | B2* | 5/2016 | Allen | A01K 13/001 |
| 2006/0174842 | A1* | 8/2006 | Bond | A01K 13/001 |
| | | | | 119/664 |
| 2012/0189371 | A1* | 7/2012 | Morelli | A47L 1/08 |
| | | | | 401/7 |
| 2013/0269136 | A1* | 10/2013 | Boulton | A41D 19/01594 |
| | | | | 15/227 |
| 2016/0073611 | A1* | 3/2016 | Hightower | A01K 13/001 |
| | | | | 119/603 |

* cited by examiner

PET CLEANING APPARATUS

CROSS REFERENCE TO RELATED APPLICATION

The present application claims benefit of priority to foreign application GB1210381.8, filed Jun. 12, 2012 (6 Jun. 2012), which in turn claims priority to application GB1208456.2, filed May 15, 2012 (15 May 2012), the present application claiming benefit of priority to both the aforesaid applications.

The present invention relates to a pet cleaning apparatus.

Pet owners have a difficult time cleaning their dogs.

No method has currently been designed, or been satisfactorily designed, for cleaning a dog intuitively and effectively. Therefore most of the approximately 400 million owned dogs in the world are cleaned by two methods not designed for such a use; cleaning outside with a hose, and cleaning inside with an instrument such as a shower head which was intended for human use.

Both of these methods have significant problems both for the owner, and for the dog.

If a hose is used to clean a dog, it may be considered demeaning to a pet. Much water is lost and many hoses do not output warm water, which is preferable for cleaning of a dog. There is no shampoo and/or mixing system. A huge amount of water may be lost and wasted as the aiming method is indiscriminate and the pet may attempt to escape.

Similarly, a huge amount of fluid output may be wasted when using a showerhead. Again, any addition, such as a shampoo, must be applied separately thus halting the cleaning.

The most significant problem that characterises both of these methods is that two hands must be used to perform the cleaning and to perform two separate, and often conflicting, tasks. One hand must hold, pet, and clean the dog, whilst the other hand is permanently occupied holding and aiming the fluid outputting instrument, which may be a shower head or a hose.

This can cause extremely bad results;

It is in the nature of a dog to shake its coat if the coat becomes saturated with water. This causes huge problems during the cleaning process; with one hand already taken up holding the outputting instrument, it is extremely difficult to stop the dog from shaking its coat, the dog thus spraying, possibly dirty, water all over the user, and, in the case of a dog being cleaned inside a house, spraying, possibly dirty fluid, about a house.

Worse still, because each hand is performing conflicting tasks, if a user acts instinctively to try to stop the dog from shaking its wet coat, this may result in control being lost of the spraying instrument, which can have even worse results, such as significant amounts of water being sprayed about unintended locations, about a house and personal objects, or even at the user themselves. This is a problem known to all dog owners.

The problem is multiplied in a situation where a pet attempts an escape. Again, this may lead to an instinctive attempt by a user to hold the dog, which may lead to a significant loss of control of the fluid outputting instrument, with the aforementioned results.

Because these methods are not designed for cleaning of a dog, a dog often attempts an escape. Pet owners know this, and become more concerned, which makes the pet more concerned, thus making an attempted escape even more likely.

Neither method is portable as it relies on a conveniently placed and not omnipresent external water input source.

It is clear these methods are ineffective and troubling both to a dog and an owner, which is proven by the fact that many pet owners resort to a third option—they avoid cleaning of the dog entirely and hire a kennel or professional to clean the dog, which may include sending the dog away to a cleaner. This is expensive and some pet owners cannot afford this service.

Pet owners want a solution for cleaning a pet that is simple, loving, effective and elegant, preferably comprising an all-in-one solution.

Some efforts have been made to design devices that solve the problem of two conflicting hands being required to clean a dog; one for cleaning, one for holding of a fluid-outputting instrument. One solution that the present invention endorses, is a fluid outputting glove device that is wearable by a user so that a pet can be cleaned, scrubbed and petted with the use of a single hand, the fluid being outputted from a palm of the glove device. The other hand can be used to pet, clean and hold the dog, greatly lessening the chance of an escape and facilitating immediate holding of a dog if it tries to shake its coat.

However, there are significant problems with a basic embodiment of a fluid-outputting glove. First, there is no mixing facility—if shampoo, conditioner, or any agent is required for cleaning or treating of a dog, we return to a problem of multiple hands being required for differing jobs, which will halt the cleaning process and may lead to the dog successfully shaking its coat or attempting an escape.

Secondly, in a basic embodiment, a fluid outputting glove device may require an external fluid input source, such as a hose or tap. Thus it is not viably portable as it relies upon a fluid input source that is conveniently placed and not omnipresent. Its lack of any elegant mixing solution or any pressurizable element for pressurized fluid outputting may limit its effectiveness.

Furthermore, the glove may not provide multiple variable output options for a user, such as the ability to spray a pet from a distance and to output fluid onto the pet only when in contact via the use of a pressure-activated unit or the like.

In short, a basic fluid outputting glove is limited in its ability to provide an effective, intuitive, and variable method for how to clean a dog. It is not a total solution.

US patent 2010/0282182 A1 provides a pet cleaning apparatus which comprises a fluid outputting glove and a bladder bag that holds multiple fluid inputs. It does have mixing facility, and could therefore be termed self-contained. However, it is extremely limited; it relies upon gravity for fluid outputting and requires strapping of a movable bag to a body, which is unwieldy and cumbersome. It is not independent in that it requires strapping to the body and that the bladder bag be located above the fluid outputting glove device for fluid outputting—the apparatus does not comprise a pre-pressurizable mechanism and therefore relies upon gravity.

It lacks elegance because it relies upon external forces to function and is thus not an all-in-one independent solution. It lacks elegance because it relies upon and forces a user to wear it about themselves—an action that may be unnatural, undesired and unfashionable for a user. The bladder bag is innately puncturable and cannot receive a, for example cartridge-based, removable and replaceable mix addition container as it is maleable and not of pre-determined dimension.

Many pet owners will refuse to wear a bladder bag attachment for cleaning of a dog.

The bladder bag does not integrally mix the mix additions. Therefore whilst the apparatus, including the glove device and connecting tubes, could be said to be self-contained, the bladder bag is certainly not a self contained fluid control and mix delivery system and/or station.

Furthermore, the glove device does not provide multiple variable output options for a user; it does provide a mixing facility, but not variable options such as interchangeable ability to spray fluid from a distance, to not output a fluid, and to output a fluid only when pressure is applied to a surface via a pressure activated unit on the glove.

A fully self-contained independent solution for cleaning of a dog has not been provided. Pet owners want a solution for cleaning a pet that is simple, effective, and elegant.

SUMMARY

The present invention seeks to provide a solution to any or all of these problems by providing, in accordance with a first aspect of the invention, a pet cleaning apparatus, comprising: a self-contained, portable, lightweight, pre-pressurizable fluid control and mix delivery station, itself comprising: a fluid containment chamber; a mechanism for pressurizing said fluid containment chamber so that fluid is outputtable under pressure; at least one of: at least one mix addition holding chamber; at least one mix addition compartment; at least one mix addition holder, a mixing system configured to facilitate mixing of at least one mix addition with a fluid, thus outputting a mixed fluid from the station; and a housing for substantially housing said comprising elements of the station; a glove device, itself comprising: a wearable housing, wearable about a hand of a user; and at least one fluid output point located about a palm of the device; a connecting member configured to connect the station and the glove device, so that pressurized fluid outputted from the station is connectably outputtable from the at least one fluid output point about the palm of the glove device, thus facilitating simultaneous petting, holding, and cleaning of a pet by a user with a single hand; and a manual selecting element configured so that manipulation of the selecting element by a user movably manipulates the mixing system, thus allowing mixing to be manually controlled by a user.

The station is standalone and of fixed dimensions. It is independent and does not rely upon external forces. Because it includes a pressurizable element, the station can output fluid under pressure, therefore it can be placed and used in any location. Thus it may be placed on a floor by a user in proximity to the user and a dog, facilitating close and intimate cleaning whilst the glove device outputs a fluid powerfully and/or controlledly when held at any angle or height with respect to the station.

The station includes a fluid control and mix delivery system integrally. This affords multiple benefits; pet owners want a simple and effective way to clean a dog—because the mixing system is integral and/or internal to a housing of the station, the mixing system and any related tubing and/or cables that facilitate mixing can be hidden from view of the user. The user preferably sees simply a single fluid output from the station. This is extremely elegant and usable.

The mixing system may comprise a valve with apertures, which may be movable and/or rotatable so that at least one apertures aligns with a mix addition aperture for mixing. The valve may also afford a 'closed' option whereby fluid output from the station is halted. Thus fluid control and mixing can be provided within a self-contained fluid control and mix delivery station.

Because the station is of fixed proportions, a mix addition of any shape or form may be introduced into a mix addition holding chamber within, or substantially within, the station, thus enhancing its independence. A mix addition may be a fluid, gel, powder, or any other material—the station is thus flexible in that it may allow for any such mix addition input.

Preferably a mix addition, for example a shampoo, may be purchased in a shampoo container as standard, and insertedly locked within, or substantially within, the station, thus functioning as a removable and reloadable cartridge. Thus a mix addition holding chamber may be specifically designed for a shape of mix addition container. Preferably the chamber includes a holding mechanism for holding the mix addition, which may feature a spring or the like, thus fixedly holding the mix addition in place for mixing by the mixing system. Thus a mix addition container may be locked, or substantially locked, into the station for mixing.

A manual selecting element, which may be a dial, is preferably located on the housing of the station for easy access by a user.

It can thus be seen that with a pressurizable mechanism pre-pressurized, and a mix addition added to the station, the station becomes an independent all-in-one solution for outputting, controlling, and/or mixing of a fluid for cleaning of a pet. This is an all-in-one solution.

The glove device can be worn by a user and outputs fluid from a palm of the device.

Preferably it has a pressure activated unit on a palm of the device so that fluid is only outputted from a main fluid output point when the palm of the glove comes into contact with a dog.

This saves vast amounts of fluid and ensures/enhances targeted aiming of the fluid at a desired surface of the dog. It is also extremely intuitive and pleasing.

Thus there may be a double control facility whereby a fluid output from the station may be turned on, but the fluid is not outputted from the glove until pressure is applied to the dog by the glove.

Preferably there is a second output feature, offering a variable output option to a user, whereby there is provided a movement and/or pressure activated unit about the glove which activates a spray output from the glove so that a surface of a dog may be targetedly sprayed and cleaned from a distance. The unit may be activated by movement of one or more digits by the user.

Again, this is highly effective, highly intuitive, saves water, and enhances cleaning of a dog for the dog and the user.

Thus the glove device and the apparatus preferably offers multiple variable output options for a user, greatly enhancing the effectiveness and experience of cleaning of a dog.

Preferably the glove device is covered in a, preferably dog mimicking, synthetic fur materials, which adds design, feel, and comfort, and may be pleasing both for a user and for a dog. A design may be finished by providing a paw-mimicking configuration on a palm of the device, so that the glove mimics aspects of a dog paw, the dog paw feasibly playing a role in output options and usages of the glove.

According to a second aspect of the invention, there is provided a pet cleaning apparatus, comprising: a fluid control and mix delivery station, the station itself comprising: a fluid containment chamber; a hand pump pressurizing mechanism configured for pressurizing a chamber in the station, resultant in a fluid in the station being pressurized for pressurised outputting from the station, the hand pump being pumpable by a user; a mix selecting system, the mix selecting system itself comprising: a mixing system, the mixing system incorporating at least one aperture configured so that, when the aperture is open, a mix addition is drawn into a pressurized fluid, said pressurized fluid pressurized via pumping of the hand pump by a user, a pressurized mixed fluid thus being outputted for cleaning of a pet; and a manual selecting element at least one of: on; about, the station, the mix selecting system configured so that manipulation of the manual selecting element movably manipulates the mixing system, the at least one aperture being openable via movement of the manual selecting element to facilitate mixing and closable via movement of the manual selecting element, so that mixing is manually controlled by a user; and a housing for substantially housing said comprising elements of the station, at least one of: a mix addition holding chamber; a mix addition holding compartment; a mix addition holder, for holding a mix addition; a glove device, the glove device itself comprising: a wearable outer housing; an inner compartment for a user to fit a hand into for wearing; a fluid input point for receiving of pressurized fluid from the station; and a fluid output point, comprising at least one fluid output aperture, for outputting said pressurized fluid for cleaning of a pet, and a connecting member for connecting the station and the glove, thus facilitating passage of pressurized fluid from the station to the glove, for outputting, and cleaning of a pet.

According to a third aspect of the invention, there is provided a pet cleaning apparatus, comprising: a lightweight, portable, fluid control and mixing station, the station itself comprising: a fluid containment chamber for holding fluid for cleaning of a pet; a pressurizing mechanism so that the fluid can be outputted at pressure from the station; at least one of: a mix addition holding chamber; a mix addition compartment; a mix addition holder; and a housing for substantially housing said comprising element of the station; a glove device for outputting fluid for cleaning of a pet, the glove device comprising: a wearable housing for wearing by a user; a fluid input point for receiving fluid outputted by the station; and a fluid output point for outputting fluid from the glove for cleaning of a pet; and a connecting member for connecting the glove and the station, thus facilitating flow of fluid outputted from the station to the glove, the station further defined as being substantially rigid, thus of fixed proportions, and having a substantially flat base, the station thus configured for sitting flatly on at least one of: a floor; a ground surface, the station independent in that: it does not require wearing; it does not require an external fluid input source during use; and it sits securely and placedly, not requiring movement, during pet cleaning.

According to a fourth aspect of the invention, and focusing particularly on the glove device as aforementioned, there is provided a pet cleaning glove device, comprising: a wearable housing, wearable about a hand of a user; a fluid input point for receiving pressurized fluid; a fluid output point for outputting fluid, the fluid output point itself comprising at least one aperture for outputting fluid, the output point located about a palm of the glove device, the glove device thus configured for pressurized fluid outputting from the palm of the device for cleaning of a pet.

As aforementioned, preferably the glove device provides variable output options for a user.

There may be provided a storage container comprising a cavity, a lid for closing the cavity, and a pet cleaning apparatus as aforementioned.

The container makes the apparatus fully portable so that it may be stored easily and taken on an away trip where a dog may get dirty. Thus a dog may be cleaned before, for example, re-entering a car.

There may be provided other comprising elements that may be stored in the storage container, including an expanding or self-expanding bathing pool that may have an openable water outlet, some nourishment and/or treats for a dog, and a cleaning item such as a towel or mat, so that the container houses a pet cleaning and training system, which may also include a training video and/or media. The expandable bathing pool opens a possibility for a dog to be cleaned in a standard domicile surrounding, such as in a living room, with a user being sat on a sofa whilst cleaning.

The present invention will now be more particularly described, with reference to the accompanying drawings, by way of example only and in no way limiting the scope of the invention, in which FIG. 1 is a perspective view of a portable lightweight self-contained pre-pressurizable fluid control and mix delivery station in accordance with a first, second, and third aspect of the invention, with a transparented view of a mix addition chamber, an embodiment of a fluid control and mix delivery system, and a pressurizing mechanism in accordance with a first aspect of the invention;

DETAILED DESCRIPTION

Figure 1:
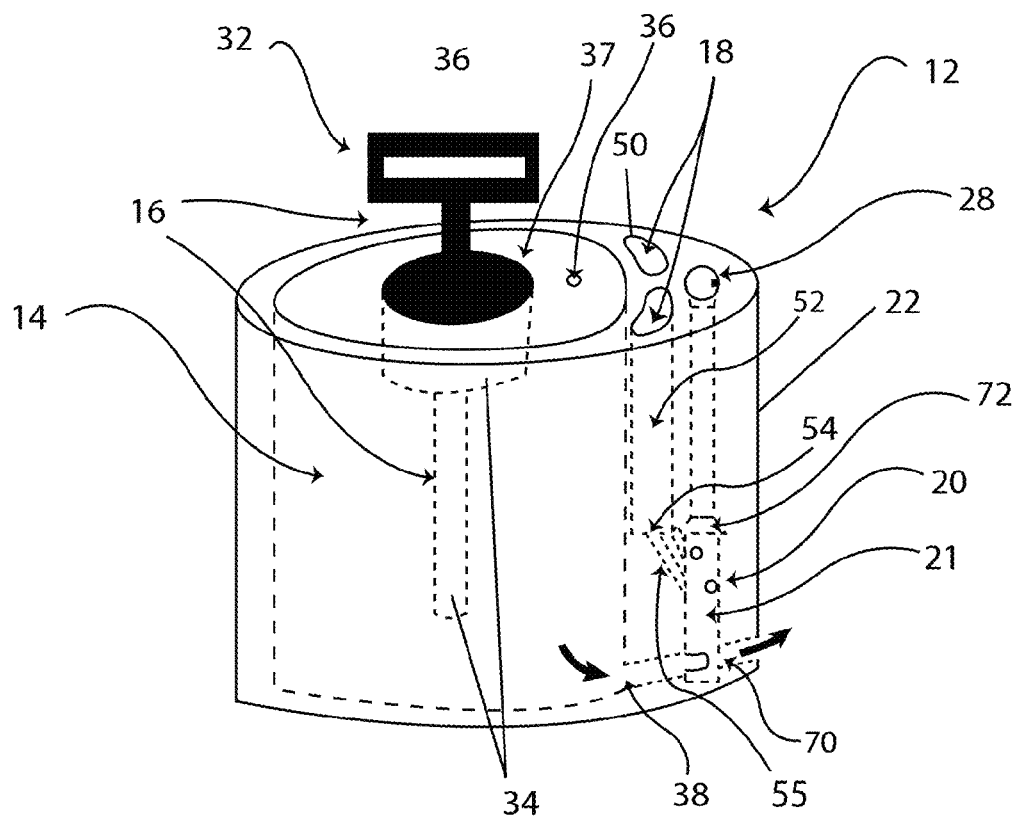
Figure 2:
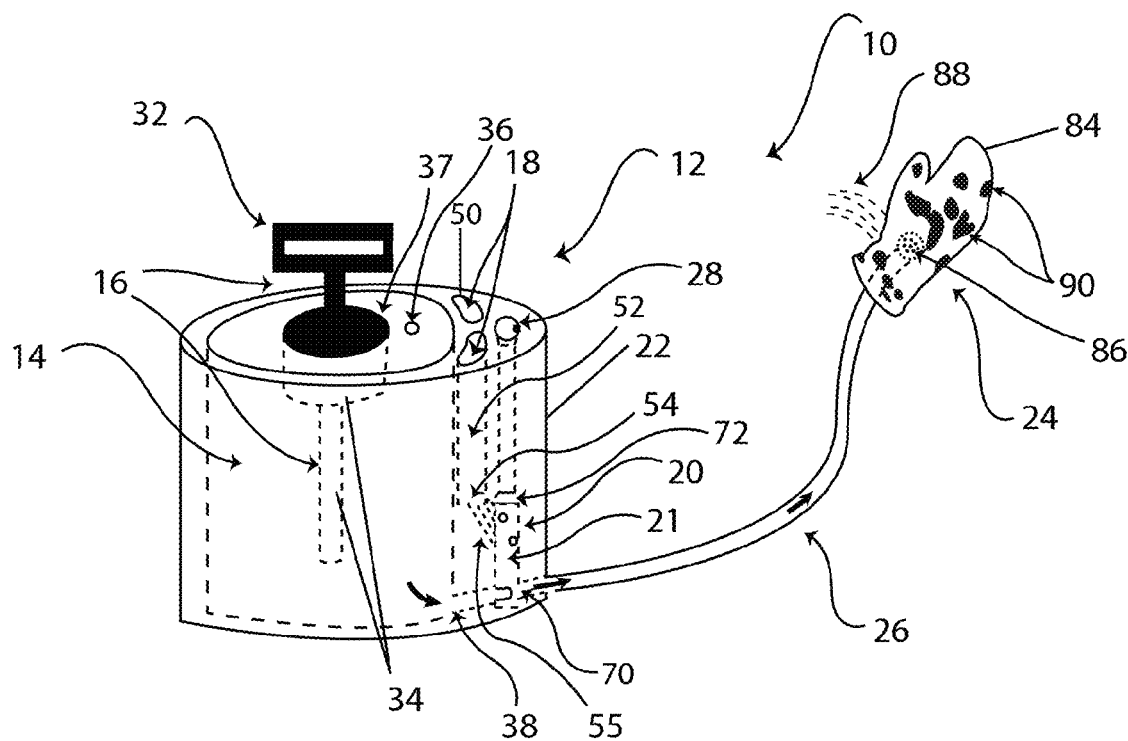
FIG. 2 is a perspective view of the portable lightweight self-contained pre-pressurizable fluid control and mix delivery station and a glove device.

Referring to the drawings, there is shown a pet cleaning apparatus 10, which comprises a portable lightweight self-contained pre-pressurizable fluid control and mix delivery station 12, itself comprising a fluid containment chamber 14, a mechanism for pressurizing 16 said fluid containment chamber 14, at least one mix addition holding chamber 18, a fluid control and mix selecting system 20, and a housing 22 for housing said comprising elements. The apparatus 10 further comprises a glove device 24, a connecting member 26, and a manual selecting element 28.

The mix delivery station 12 is preferably oval in shape and sits flat against a surface.

The fluid containment chamber 14 can be filled with a fluid 30 by a user.

The fluid containment chamber 14 may be pressurized by a mechanism for pressurizing 16, which may be a hand pump 32. There are various methods of pressurising a fluid and/or chamber, which will be obvious to those with skill in the art, such as use of a pressurized canister as an example. In a preferred embodiment where there is provided a hand pump 32, the mechanism for pressurizing 16 features an internal pressurizing element 34.

The pressurizing mechanism 16 may also feature a safety pressure valve 36 so the fluid containment chamber 14 does not over-pressurize. Preferably it has a screw-top lid 37 so that it is removable and tightly screwable, thus fluid 30 can be poured into the fluid containment chamber 14 by a user, and the lid 37 can be tightly fitted prior to pressurization.

Preferably the containment chamber 14 is of plastics materials that have flexible qualities such that it can more adequately withstand high pressure due to flexible properties. It has a fluid chamber output point 38, and preferably has a line of sight volume measurer 40 which may have multiple volume measurements 42 so that volume of a fluid 30 in the chamber 14 may be easily seen by a user.

Preferably fluid 30 can be poured into the fluid containment chamber 14 via a large aperture into which the, preferably removable, hand pump 32 and/or mechanism for pressurizing 16 tightly fits.

There is provided about the housing 22 at least one mix addition holding chamber 18 which holds a mix addition 44 either within, or substantially within, the station 12. There may be a first mix addition 46, and a second mix addition 48, or any number of mix additions 44, the system being scalable. A mix addition holding chamber 18 may have an opening 50, which may open to a compartment 52. The holding chamber 18 comprises an opening 50, a mix addition compartment 52, for holding of a mix addition 44, and a mix addition output point 54, so that a mix addition 44 may be outputted from the mix addition compartment 52 for mixing.

A mix addition 44 may be a fluid, gel, powder, or any other materials. It may be a powder or liquid poured into the mix addition holding chamber 18, or it may be, as an example, but in no way limited to such an example, a shampoo contained within a mix addition container 56, which may be a bottle. Thus a mix addition container 56 or a bottle and/or container containing any mix addition agent, such as a conditioner or a treating agent, may be locked fixedly into the mix addition compartment 52, the container 56 thus functioning as a cartridge. Thus preferably a dimension of the opening 50 of the mix addition holding chamber 18 matches a circumferential shape of a mix addition container 54, the container 54 thus slotting into the holding chamber 18 for mixing.

Fixing of a mix addition container 56, which may act as a cartridge, within, or substantially within, a housing 22 of the station 12 may be achieved in many ways which will be obvious to those with skill in the art. An example of a possible embodiment of a fixing mechanism will herein be described which in no way limits the scope of the invention and is described by way of example only.

Figure 8:
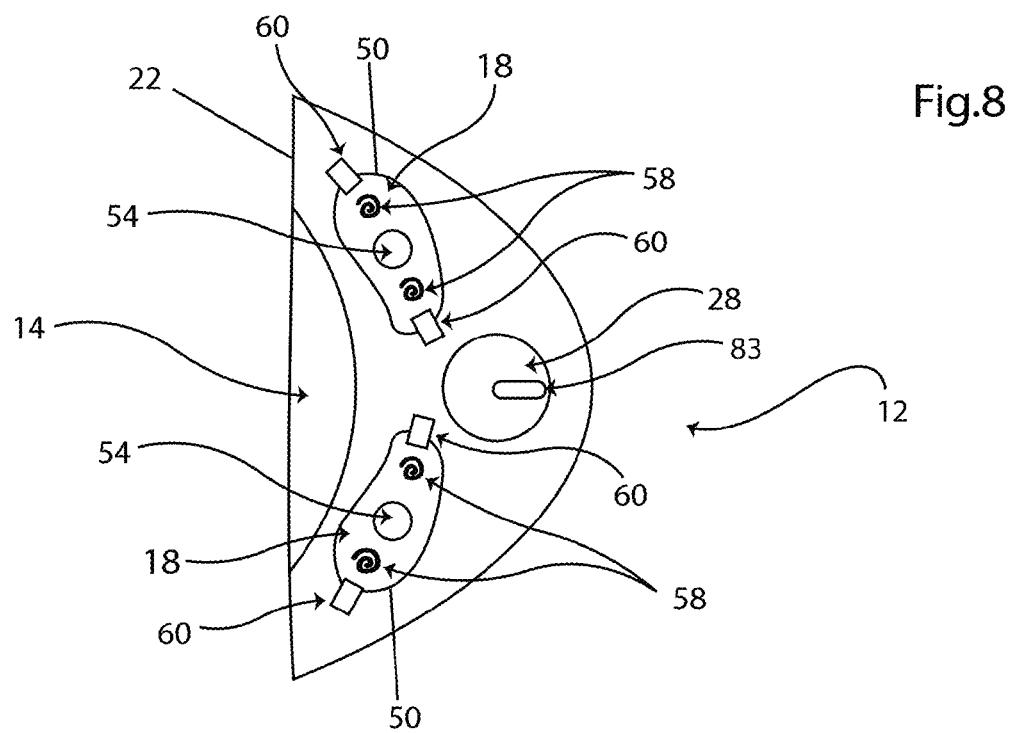
FIG. 8 is a sawn off bird's eye view of an embodiment of a mix addition holding chamber where a mix addition container is lockable within a housing of the station, functioning as a cartridge.

With reference to FIG. 8, there is shown a sawn-off section of the housing 22, focusing primarily on the at least one mix addition holding chambers 18 from a bird's eye view. A possible embodiment for a fixing mechanism is shown. A chamber opening 50 may lead to a mix addition holding chamber 18, which may feature at least one springs 58 on a floor of the holding chamber 18, and a mix addition output point 54, which may lead to a mix addition output tube 55, thus facilitating mixing.

As a mix addition container 56, which may be a shampoo bottle itself functioning as a cartridge, is downwardly pressed and inserted into the mix addition holding chamber 18, the at least one floor springs 58 resist, attempting to push the container 56 out of the chamber 18. At a top of the chamber opening 50, there may be provided at least one fixing member 60 for holding a mix addition container 56 within a mix addition holding chamber 18. The fixing member 60 may itself be spring loaded and may be downwardly curved at an overhanging edge so that when pressurized from above, preferably by a container 56, it may recede, thus facilitating entry of a mix addition container 56 through the chamber opening 50 and into the mix addition holding chamber 18, fixedly fastening the container 56 within the holding chamber 18. Thus the at least one floor springs 58 at a base of the chamber 18 facilitate removal of the, feasibly cartridge-based, mix addition container 56 by upwardly pushing a portion of a mix addition container 56 out of the housing 22 so that it can be removed by a user.

If a mix addition 44 is a powder or is received by the station 12 without a container 56, it may be poured into a mix addition holding chamber 18. It is feasible that an addition holding chamber 18 has a line of sight measurer 40.

Let it be known that the aforementioned method for holding and fixing of a mix addition container 56 within a housing 22 of the station 12 is described by way of example only and in no way limits the scope of the invention 10. There are many ways to fixedly hold a container 56 in a compartment removably and replaceably which will be obvious to those with skill in the art, and various modifications will be apparent to persons skilled in the art without departing from the scope of the invention 10.

Other possible embodiments of a holding mechanism for holding a mix addition 44 include, but are not limited to, a bayonet system, a screw-in system, and an open-and-close top system. It is feasible that there is provided no fixing system and that a mix addition container 56 is simply inserted into a chamber 18. It is feasible that a mix addition container 56 includes an aperture designed only to release a mix addition 44 when inserted into a mix addition holding chamber 18 so that a mix addition container 56 may be removable from the station 12 without spillage.

A fluid 30 from the fluid containment chamber 14 is received by a fluid control and mix selecting system 20 via the fluid chamber output point 38. A fluid control and mix selecting system 20 may feature a valve 21.

The fluid control and mix selecting system 20 will now be described in accordance with a preferred embodiment, featuring a valve 21. There are many possible embodiments of a fluid control and mix selecting system 20, which will be obvious to those with skill in the art, and the description of the valve 21 is given by way of example only, in no way limiting the scope of the invention 10, which may have any fluid control and mix selecting system.

The fluid 30, which may be put under pressure via the pressurizing mechanism 16, is received into the valve 21 via a fluid input aperture 62. It is also feasible that a fluid input is entered through a top of the valve 21. At least one mix additions 44 may be received into the valve 21 via at least one mix addition aperture 64, which features about a casing 65 of the valve 21. Preferably the valve 21 has an output aperture for outputting a fluid, although fluid may simply be outputted from a base 67 of the valve 21. Thus a fluid input may be inputted into the valve 21 and outputted from the valve 21. The valve 21 may be movable and/or rotatable. Thus if rotated and/or moved, the at least one mix addition apertures 64 similarly move. When an aperture 64 is aligned with a mix addition output point 54, which may further comprise a mix addition output tube 55, an addition 44 is received into the valve 21. In this way a first mix addition aperture 66 may receive a first addition; a second mix addition aperture 68 may receive a second addition, and so on. Thus a fluid may be inputted and mixed for outputting. Fluid may be prevented from being outputted from the station 12 by halting input of a fluid into the valve 21, or from the valve 21. The valve 21 may be configured so that multiple mixing may take place or so that only one mix addition 44 is mixed at one time. This is easily achieved via configuration of apertures. The valve 21 thus facilitates flow control and mixing. A valve 21 is described by way of example only of a fluid control and mix selecting system 20, which is not limited to including a valve 21.

It is feasible that an aperture 64 in the fluid control and mix selecting system 20 is movable independently, so that each mix addition 44 may be added via an independent movable mix addition aperture 64 and hence an independent manual selecting element 28. Thus the manual selecting element 28 may comprise multiple buttons and/or switches and the like.

Figure 3:
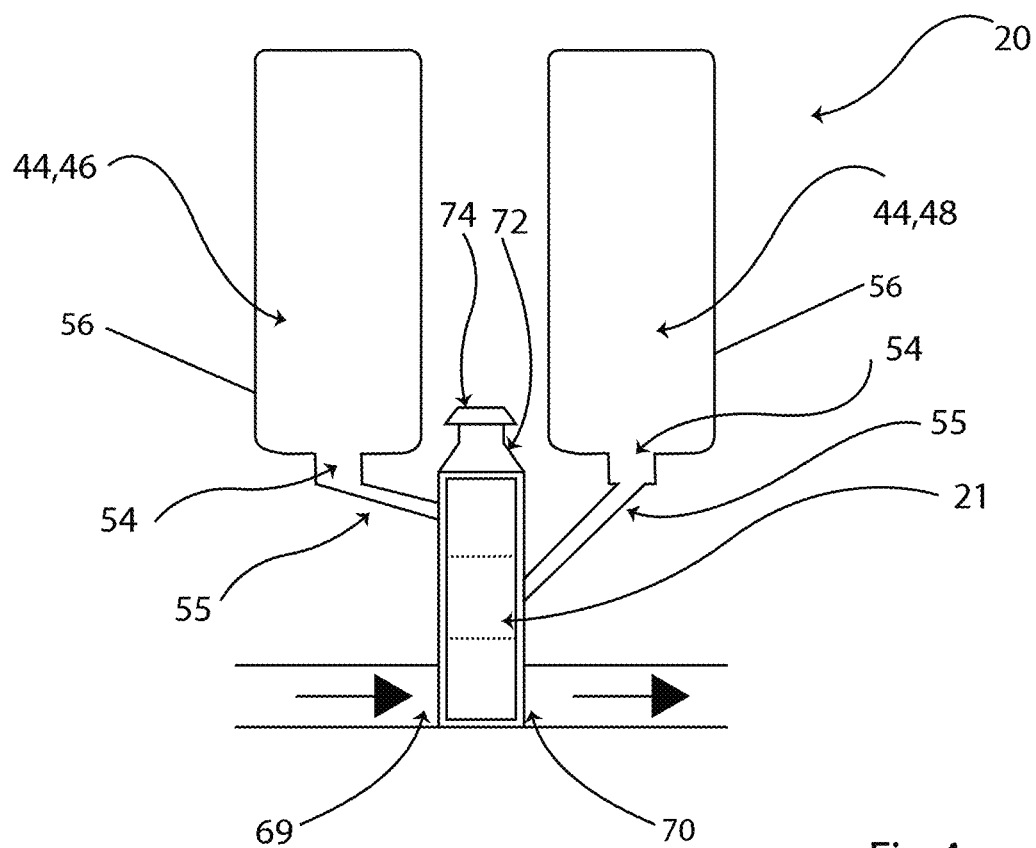
FIG. 3 is a diagrammatic cross sectional view of an embodiment of a fluid control and mix selecting system.
Figure 4:
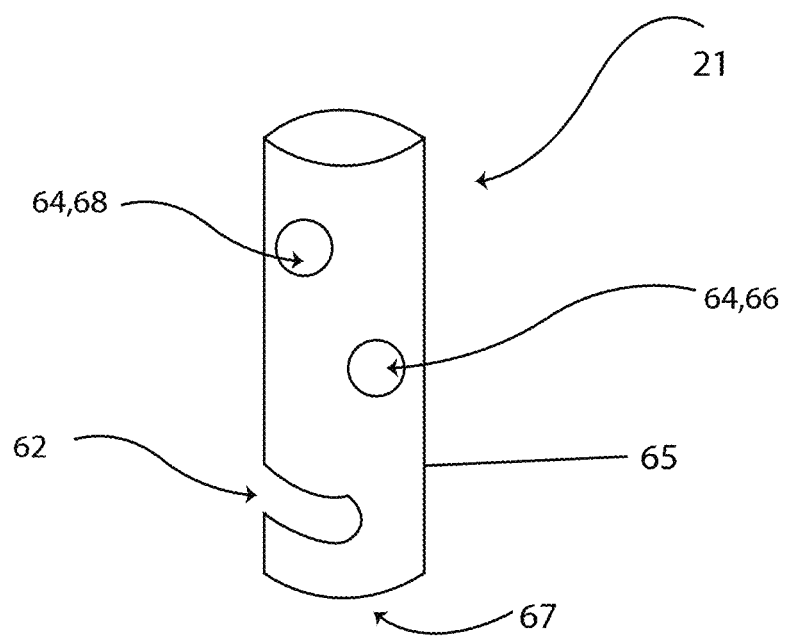
FIG. 4 is a perspective view of a fluid control and mix selecting valve.

Referring to FIG. 3, where the fluid control and mix selecting system 20 is shown diagrammatically as a cross section, there is shown a fluid input point 69 for the valve 21. It can be seen that if an input aperture 64 about the valve 21 aligns with a mix addition output tube 55 that contains a mix addition 44, mix addition 44 is drawn into the mix selecting system 20 and is mixed with a fluid for outputting.

Figure 5:
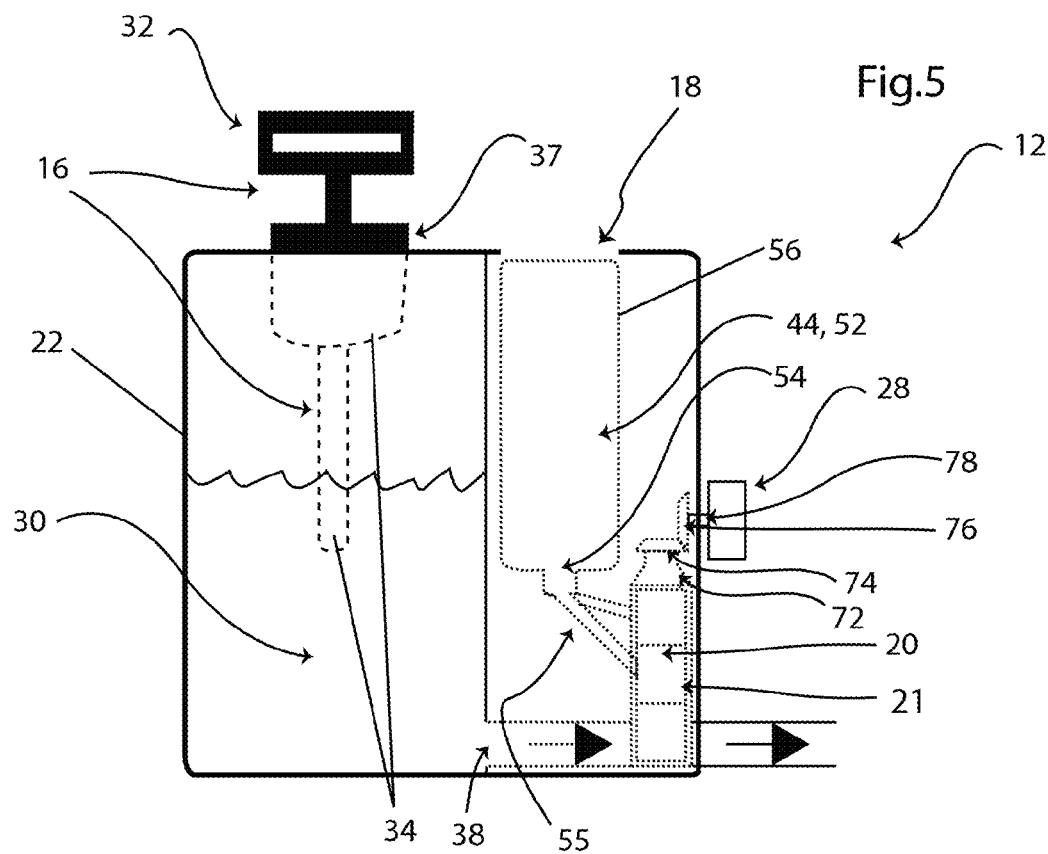
FIG. 5 is a cross sectional and partly transparented view of the pressurizable fluid control and mix delivery station demonstrating the fluid control and mix selecting system and a connected embodiment of a manual selecting element.
Figure 6:
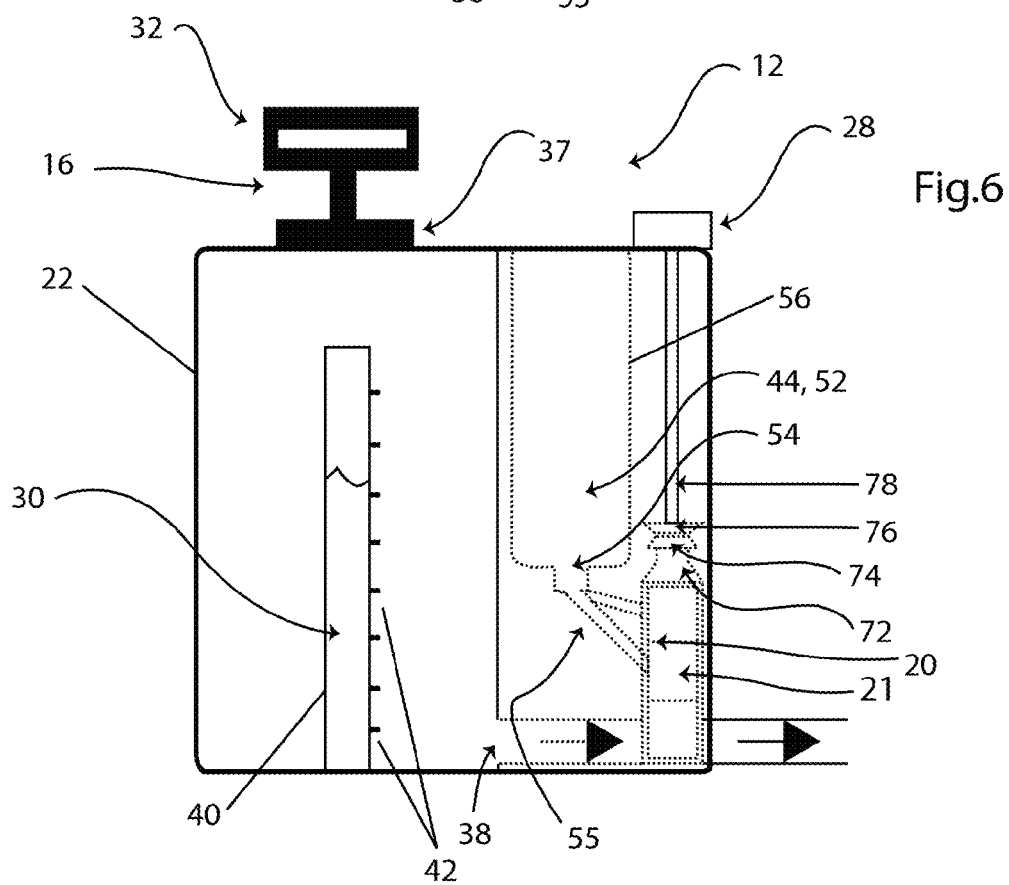
FIG. 6 is a cross sectional and partly transparented view of the pressurizable fluid control and mix delivery station demonstrating the fluid control and mix selecting system and a connected embodiment of a manual selecting element where the element is in a preferred top-facing location of the station.

Referring to FIG. 5, there is shown an embodiment of the invention 10 where a manual selecting element 28 is sideways protruding from the station 12. In a preferred embodiment of the selecting element 28, as shown in FIG. 6 and FIG. 8, the manual selecting element 28 is located on a top of the station 12, beside the at least one mix addition holding chambers 18. Thus the station 12 can be positioned below a user, the user retaining visibility and easy accessibility of the selecting element 28.

The fluid control and mix selecting valve 21 may have a knob or head 72, which may have a gear member 74 or the like so that a second gear member 76 may connect to the first gear member 74 thus facilitating movement of the valve 21 via movement of the manual selecting element 28 by a user, which may be achieved via a connecting cog 78. There are many ways of facilitating movement of a valve 21 and/or mix selecting system 20 via manipulation of a manual selecting element 28 by a user, which will be obvious to those with skill in the art. It is feasible that the valve 21 and manual selecting element 28 may comprise one part, thus movement of the selecting member 28 moving the fluid control and mix selecting valve 21.

Figure 7:
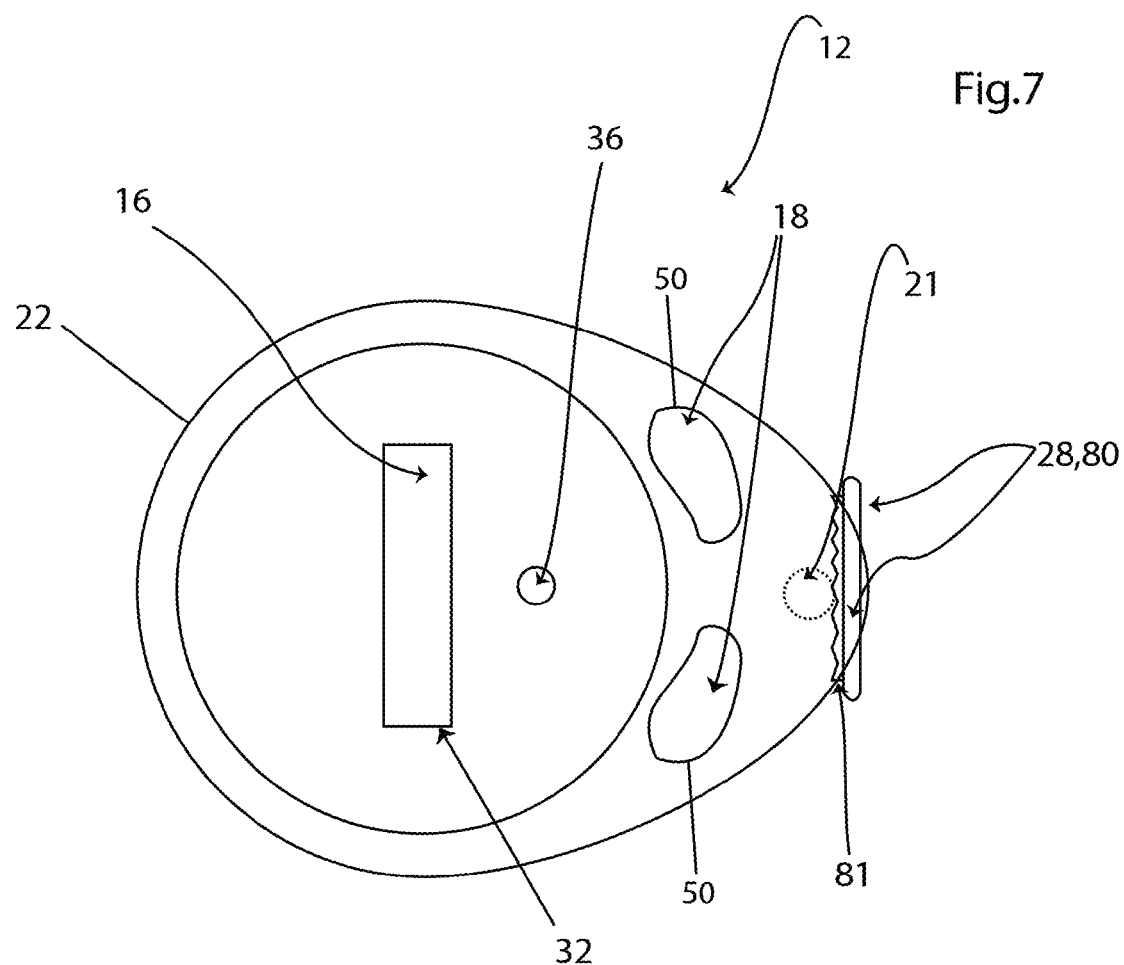
FIG. 7 is a bird's eye view of another embodiment of the manual selecting element.

A manual selecting element 28 may be engineered by various methods that will be obvious to those with skill in the art. In a preferred embodiment, as shown in FIG. 1, FIG. 2, FIG. 6, FIG. 8, and FIG. 9, the manual selecting element 28 is provided on a top facing side of the station 12. Referring to FIG. 7, there is shown an embodiment of the invention where the selecting element 28 is a tooth configuration 80, where the manual selecting element 28 either comprises, or is attached to, a tooth 81 that is connected to the fluid control and mix selecting valve 21. Thus the at least one apertures 64 of the valve 21 are moved via movement of the tooth configuration 80.

Figure 9:
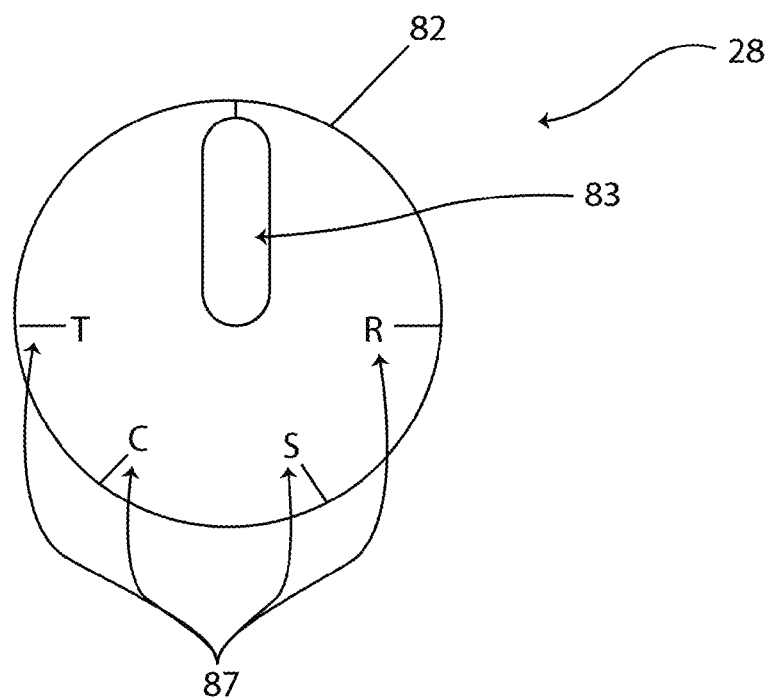
FIG. 9 is a view of a preferred embodiment of a manual selecting element.
Figure 10:
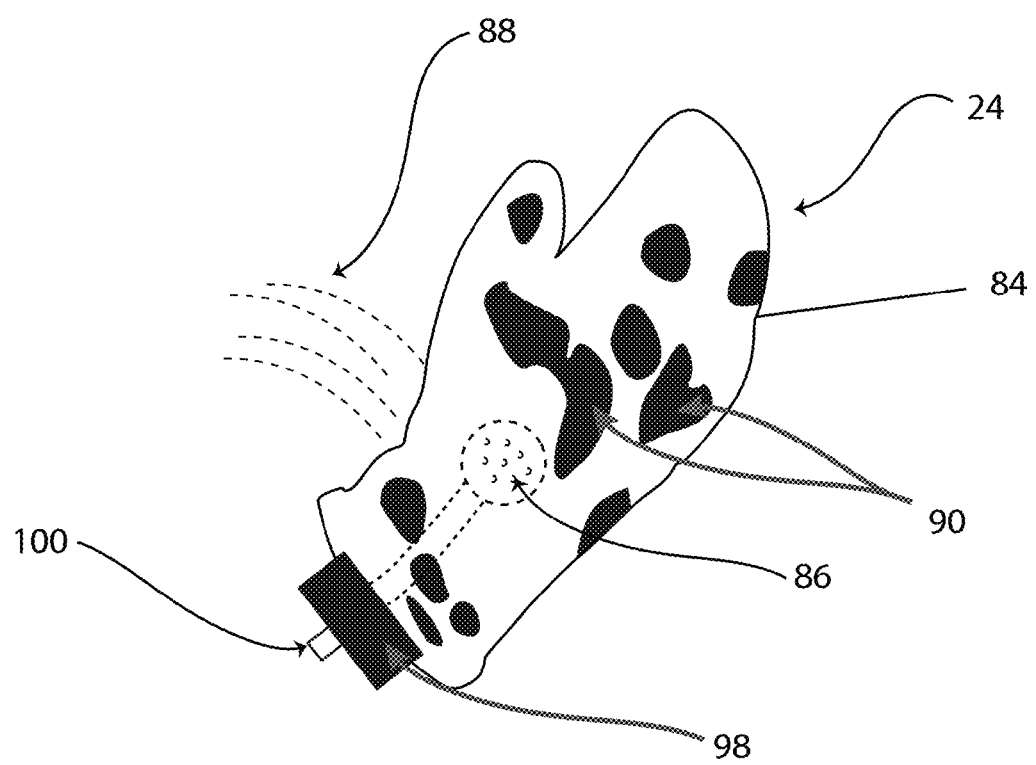
FIG. 10 is a perspective view of the glove device displaying a, preferably dog, animal mimicking fur exterior.
Figure 11:
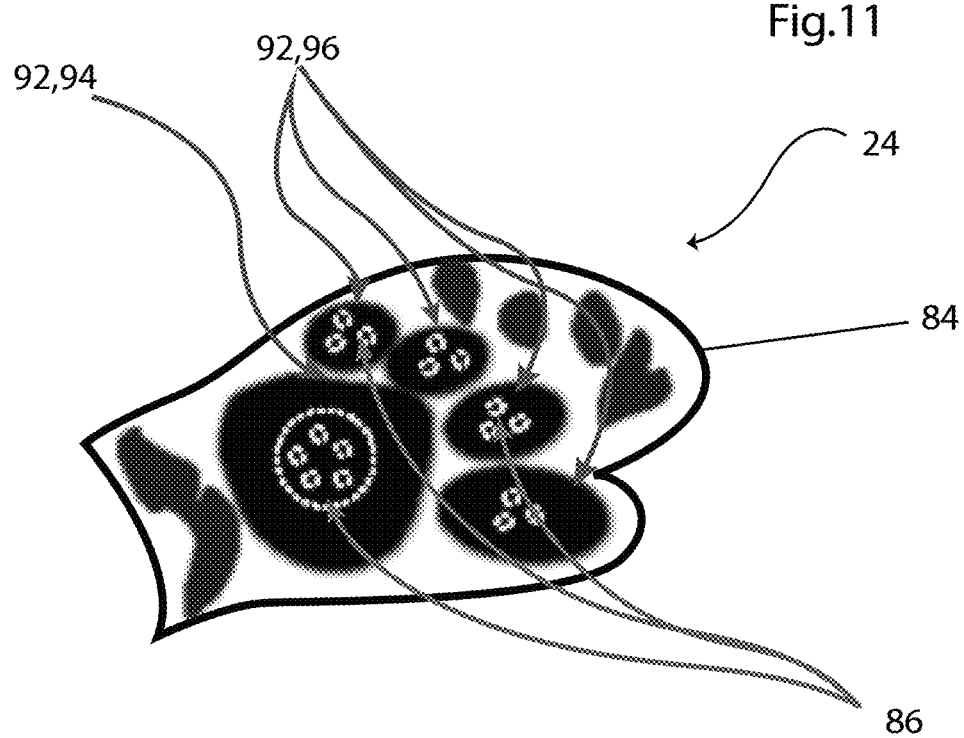
FIG. 11 is a perspective view of a palm of the glove device.

In a preferred embodiment of the manual selecting element 28, and referring particularly to FIG. 9, there is shown an embodiment where the manual selecting element 28 is a, preferably circular, dial knob 82, which is turnable. Thus mix and fluid output options 87 can be selected by a user via turning of the manual selecting element 28. Mix and fluid output options 87, which may include but are not limited to a default 'OFF' setting, a rinse setting, a shampoo setting, a conditioning setting, and a treat setting may be accessed by a user via turning of the dial knob member 84. This description of a manual selecting element 28 is provided by way of example only and in no way limits the scope of the invention 10. In a preferred embodiment of the selecting element 28, there may be provided options for an 'OFF' setting, a rinse setting where unmixed fluid is outputted, a shampooing setting, and a conditioning setting.

Referring to the drawings, there is shown a glove device 24, which is connected to the station 12 and hence fluid output of the station 12 via a connecting member 26 which may be an umbilical and/or a tube. The glove 24 comprises an outer covering 84, the covering 84 preferably fully housing a hand of a user, and at least one palm aperture 86 about a palm side of the device 24 so that mixed and/or unmixed fluid from the station 12 may be outputted via the glove 24 as a final output fluid 88.

Preferably the glove device 24 is covered and adorned in a, preferably synthetics, fur covering, which may have spots and/or markings 90 which mimic coverings of a, preferably dog, animal. This adds design appeal and offers added comfort for a pet when being petted and/or cleaned. Preferably, it is shaped as a mitt. The fur may act as padding.

The at least one palm apertures 86 may form a nozzle.

On a palm side of the glove 24, preferably the, preferably synthetics, fur covering is configured to mimic a shape of a, preferably dog, paw 92. It is feasible that a nozzle and/or at least one palm apertures 86 are located underneath, or substantially underneath, the paw 92, the paw 92 thus providing further padding so that abrasion and/or friction is not caused to a coat and/or skin of a pet. The paw 92 and/or fur covering may also act as a subduer to an outputting flow of fluid output from the glove 24, so that rather than a high velocity spray of fluid being sprayed on to a pet, the pet is cleaned via the damp paw 92 which receives fluid from the at least one apertures 86 about a palm of the device 24 and blocks the fluid from outputting directly, acting as a sponge that may be used to clean the pet, which may save water and clean effectively. Preferably the paw 92 comprises a pad 94 and four toe-pads 96, although it is not limited to this configuration.

It is feasible that there are provided at least one palm apertures 86 about multiple locations on the device 24, thus outputting a final output fluid 88 from multiple sites across the glove 24. It is feasible that a palm aperture 86 includes and/or is provided with a, preferably silicone and/or rubber, protruding element, so that a pet may be petted, cleaned, and simultaneously massaged by a, preferably silicone, protruding elements. Elements that improve massaging and/or cleaning of a pet, such as raised and/or tapered surfaces, may be included on the device 24.

There may be provided further enhancements to the glove device 24, such as a connection point 98 that may allow the glove to be connected to a mains supply of fluid, such as a garden hose and/or a tap, or via a double tap connector device which is commonly used to connect a shower head to a pair of bath taps. Thus the glove device 24 may be detachable and/or have an ability to function independently from a fluid input from the station 12. The connection point 98 may feature a universal connection point 100 which may either be directly connectable to an external fluid input source, or may require a connector, so that an external fluid input source may be connected to the glove 24.

Figure 12:
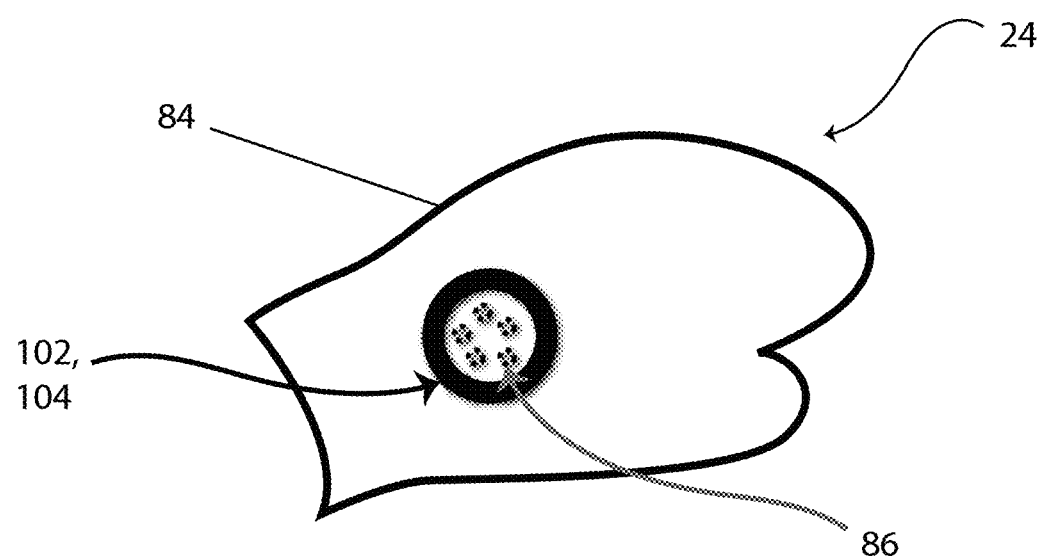
FIG. 12 shows a possible embodiment of a pressure activated unit on a palm of the glove device.

Referring to FIG. 12 and to a preferred embodiment of the device 24, there may be provided a pressure activated unit 102 on a palm of the device 24, which may be and/or feature a pressure-activated rim 104. Thus a final fluid output 88 may be controlled by a user so that pressure to the pressure activated unit 102, which may be depressible, either opens, or closes a channel for fluid to output from the at least one palm apertures 86 on the glove 24. Control may be digital or analogue. In this way, fluid output from the glove 24 may be activated by applying pressure to a surface on the glove 24, which may save significant amounts of water, may guarantee targeted application of fluid to a desired location, and may stop a pet from attempting an escape due to seeing and/or hearing copious amounts of fluid outputting, which may cause anxiety for a pet. In this way, fluid may never be seen by a pet during a pet cleaning process, which is revolutionary, and may significantly improve a pet cleaning experience.

It is feasible that a glove 24 may be designed so that fluid output may be halted by pressure to a surface by the glove 24, the pressure activated unit 102 in such a case closing a channel for fluid outputting by the glove 24. In a preferred embodiment, fluid output is activated by pressure to a surface of the glove 24.

Figure 13:
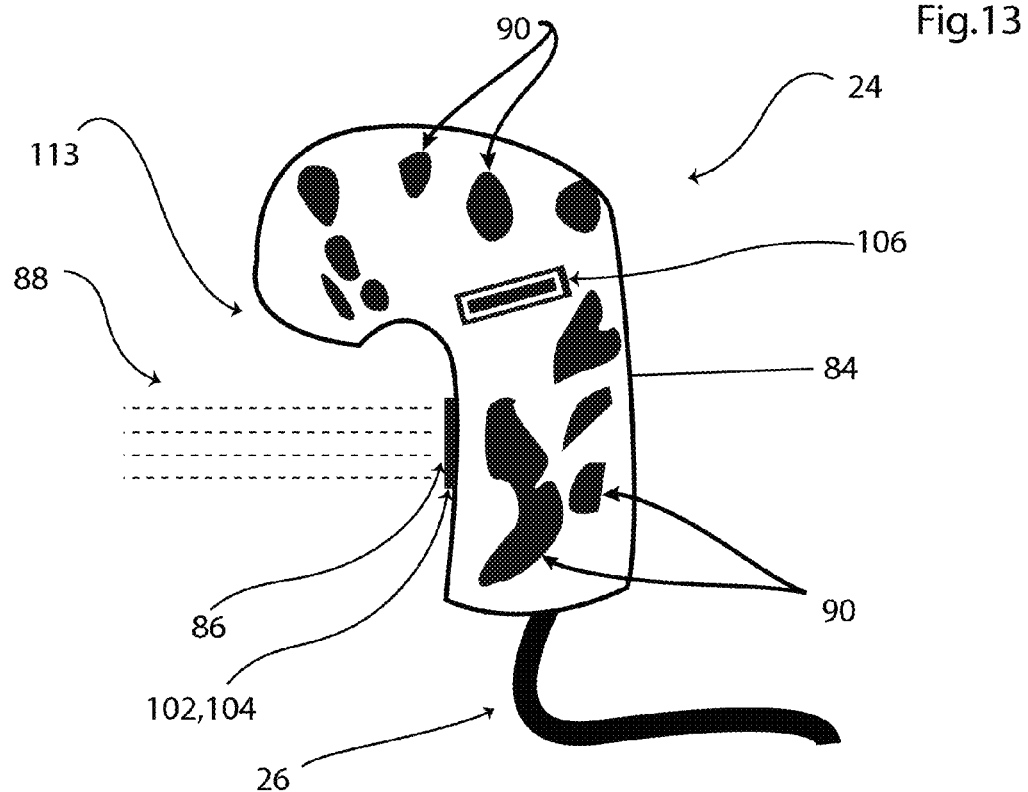
FIG. 13 shows a possible embodiment of a movement activated unit that facilitates distance spraying from the glove.

Referring to FIG. 13 there may be provided about the glove 24 a movement-activated unit 106 and/or function so that movement by a digit or digits of a user whilst wearing the glove 24 activates a final fluid output 88 from the at least one apertures 86 of the glove device 24. Thus clenching of a hand of a user may activate output of a final output fluid 88. This may be achieved in many ways that will be obvious to those with skill in the art, such as a ligamental wire, which opens and closes a channel to a fluid when stretched, or a depressible valve that opens an aperture. It is feasible that a fluid output may be outputted from a non-palm side of the device 24, such as a back of a hand.

Thus it is feasible fluid output from the glove 24 may be activated by both pressurizing on a, preferably pet coat, surface, and by movement of a digit or digits, so that fluid output is always aimed at a desired surface. The pressure activated unit 102 may guarantee a fluid flow is withheld and only outputted from the glove 24 when in contact with a pet. The movement activated unit 106 and/or function may allow an area of a pet to be sprayed and thus cleaned from a distance by a user, which may be beneficial in the cleaning of particularly dirty areas of a pet, such as under a tail. Thus fluid can be saved whilst intuitive control of a fluid output is retained fully by a user, the manual selecting element 28 being easily selectable with a second hand of the user. This aids intuitiveness, correct cleaning, and provides a large saving of fluid outputting, which has various benefits.

Figure 14:
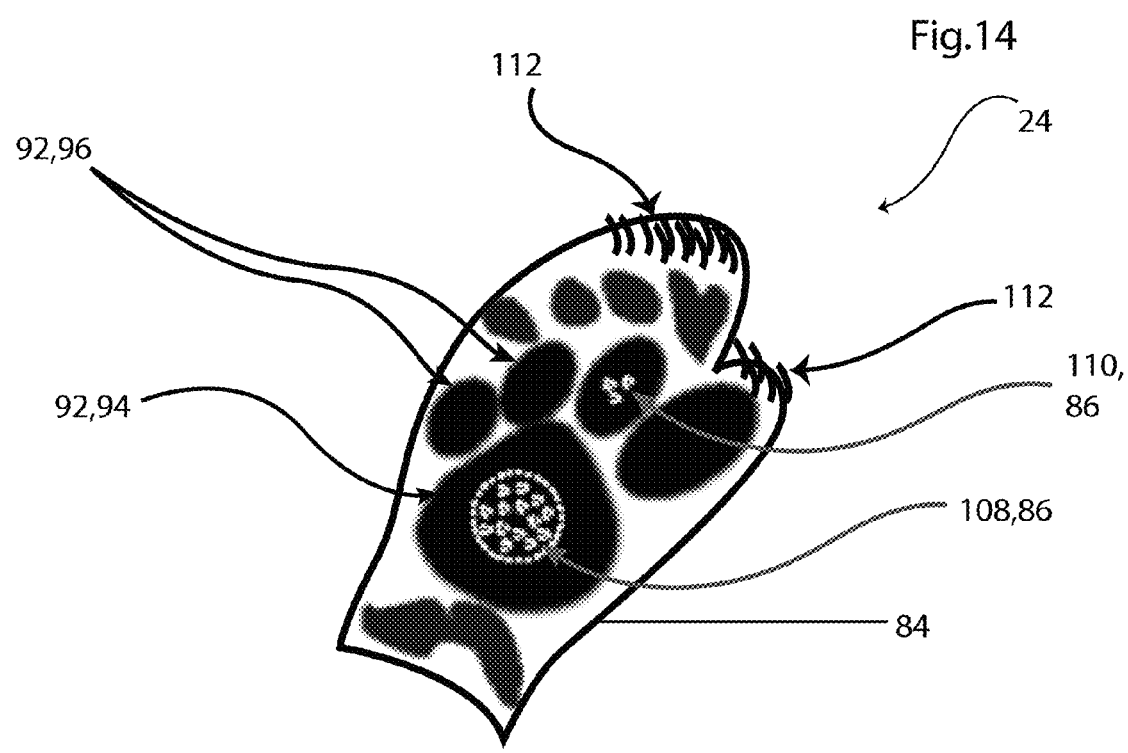
FIG. 14 shows a scrubbing surface that may be usable without activating the pressure activated unit, and shows a possible secondary fluid output point on the glove.

Referring to FIG. 14, there is provided an embodiment of the glove device 24 where there is provided a main final fluid output point 108, which comprises at least one palm apertures 86, and a secondary final fluid output point 110, which comprises at least one apertures 86, which may be substantially placed around a palm and/or hand of a user.

In such an embodiment, it is feasible that fluid is outputted from the main final fluid output point 108, which may be located centrally around a palm and/or paw pad 94 of the device 24, via pressurization of a pressure activated unit 102, so that fluid is only outputted when a palm of a hand is in contact with a desired surface to be cleaned. It is also feasible that fluid may be outputted from the secondary final fluid output point 110 via activation of a movement activated unit 106 so that the two final fluid output points 108,110 are independent of one another. The movement activated unit 106 may also be pressure activated.

Preferably a secondary final fluid output point 110 outputs fluid at greater pressure, thus being sprayable from a distance for distance cleaning. This may be achieved by providing less apertures 86 on a secondary fluid output point 110 than a main final fluid output point 108, thus outputting a final fluid output 88 at greater pressure than a main final fluid output point 108, facilitating powerful and targeted spraying from a distance by a user onto a desired and targeted surface. This has substantial benefits for a user, including powerfully and accurately targeting a problem area or an area that may be undesirable to touch, and intuitively and seamlessly interchanging to a full contact clean, which may output a fluid at less pressure for cleaning. Furthermore, there may be provided a scrubbing surface 112, which may comprise, preferably silicone, nodules, and may preferably be located about an extremity of the glove 24, which may be similar in location to the tips of a user's fingers, which are preferably inside the glove device 24.

Thus three important cleaning functions may now be provided for a user; a pet can be cleaned via pressurised contact via a pressure activated unit 102; a pet can be cleaned at a distance without contact via targeted spraying activated by a movement activated unit 106, and a coat of a pet may also be cleaned and scrubbed with a scrubbing surface 112, which may be located in such a way that a pet can be scrubbed with the scrubbing surface 112 without activating the pressure activated unit 102. Thus a lather may be scrubbed into a coat of a pet focusedly with the scrubbing surface 112, without activating a final fluid output 88, which is beneficial for effective cleaning if a lather is already present on the coat. It may be possible to activate the second final fluid output point 110 whilst the pet is scrubbed or a pet may be scrubbed independent of fluid output.

A pressure activated final fluid output point 108 and/or a secondary final fluid output point 110 that may output fluid at a greater pressure can be achieved in many ways that will be obvious to those with skill in the art. It is feasible that activation of the main final fluid output point and activation of the secondary final fluid output point 110 may be achieved via one pressure and/or movement activated unit. In a preferred embodiment, a main final fluid output is outputted via pressurisation of a pressure activated unit 102 and a secondary final fluid output which may be pressurised to a greater degree is outputted via activation of a movement activated unit 106 which is independent of a pressure activated unit 102.

A secondary final fluid output point 110 as shown in FIG. 14 that may spray fluid in a pressurised and targeted manner may be achieved, as an example, via a downwardly depressible valve 116 that features an aperture 118. When the depressible valve 116 is depressed, the aperture 118 aligns with a second aperture and/or fluid reservoir 114 so that a pressurised fluid flows through the apertures and is outputted from the secondary final fluid output point 110.

A main final fluid output point 108 may be achieved in many ways that will be obvious to those with skill in the art. Pressure applied to a pressure activated unit 102 may depress the unit, which may open a channel to a, preferably pressurized, fluid reservoir 114. Thus if the unit 102 is depressed, fluid is outputted from a main final fluid output point 108. It is feasible that a main final fluid output point 108 may be designed in such a way that fluid is outputted substantially slower and under less and/or different pressure than it is received into the device 24, so that it is of a pressure than will not scare a pet, will not waste fluid, and will effectively clean a pet. It is feasible that fluid output pressure of the main final fluid output 108 and a secondary final fluid output point 110 or any final fluid output point may be controllable by a user.

Figure 15:
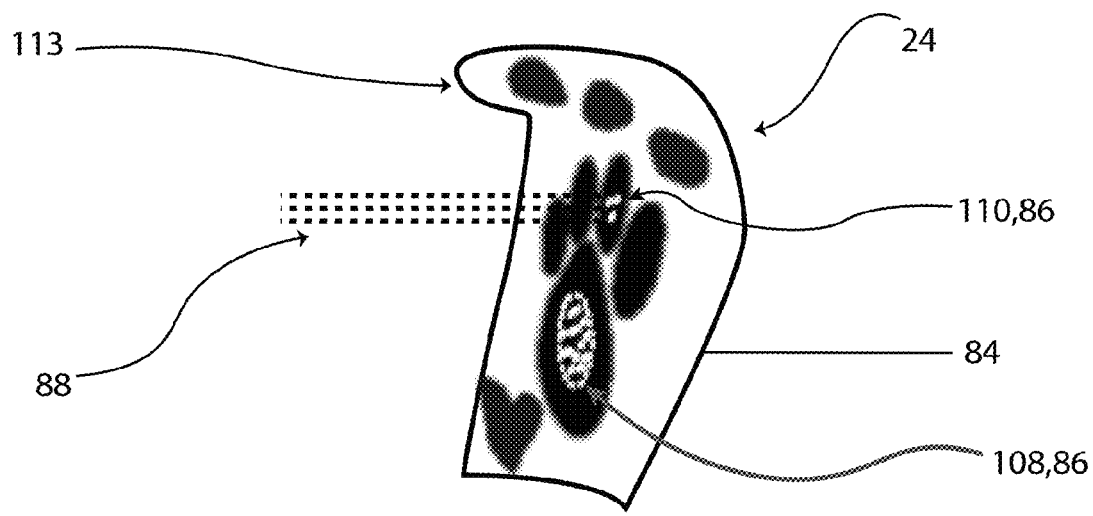
FIG. 15 shows the movement activated unit and the secondary fluid output point in action.

Referring to FIG. 15 there is shown an embodiment of the glove device 24 where a secondary final fluid output point 110 has been activated by bending of a user's fingers. Because a hand of a user has been moved inside the device 24, creating an overhang 113, pressure has been applied to a movement activated unit 106 which aligns an aperture 118 so that fluid is outputted from the glove 24, preferably under pressure, via the secondary final fluid output point 110. Bending by a finger or fingers of a user may depress a valve 116 that aligns an aperture 118 with a fluid input source, which may be a reservoir 114 so that fluid is outputted. It is feasible that extending of one or more digits may similarly activate fluid output, thus bending of a digit could be extendingly bending of a digit.

Figure 16:
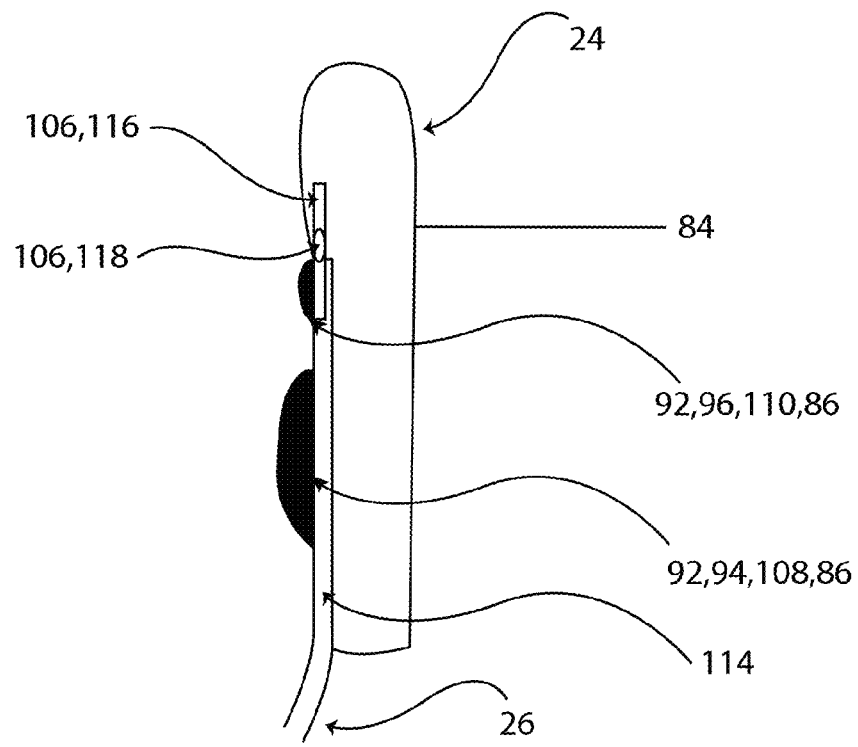
FIG. 16 is a cross sectional view of an embodiment of a movement activated unit which has not been activated.

Referring to FIG. 16, a possible embodiment of the device 24 is shown for outputting fluid via movement of a movement activated unit 106. Fluid is inputted into the device 24 via the connecting member 26, which forms a small fluid reservoir 114 inside the device 24. The fluid in the reservoir 114 cannot gain access to a, preferably secondary, fluid output point 110, the path being blocked by a movement activated unit 106, which may be a depressible valve 116 that features a movable element and an aperture 118. The unit 106 blocks fluid from the at least one output apertures 86 of the, feasibly secondary, fluid output point 110, which may be designed as a paw pad 96 of a paw 92.

As aforementioned, a movement activated unit 106 may be pressure activated.

Figure 17:
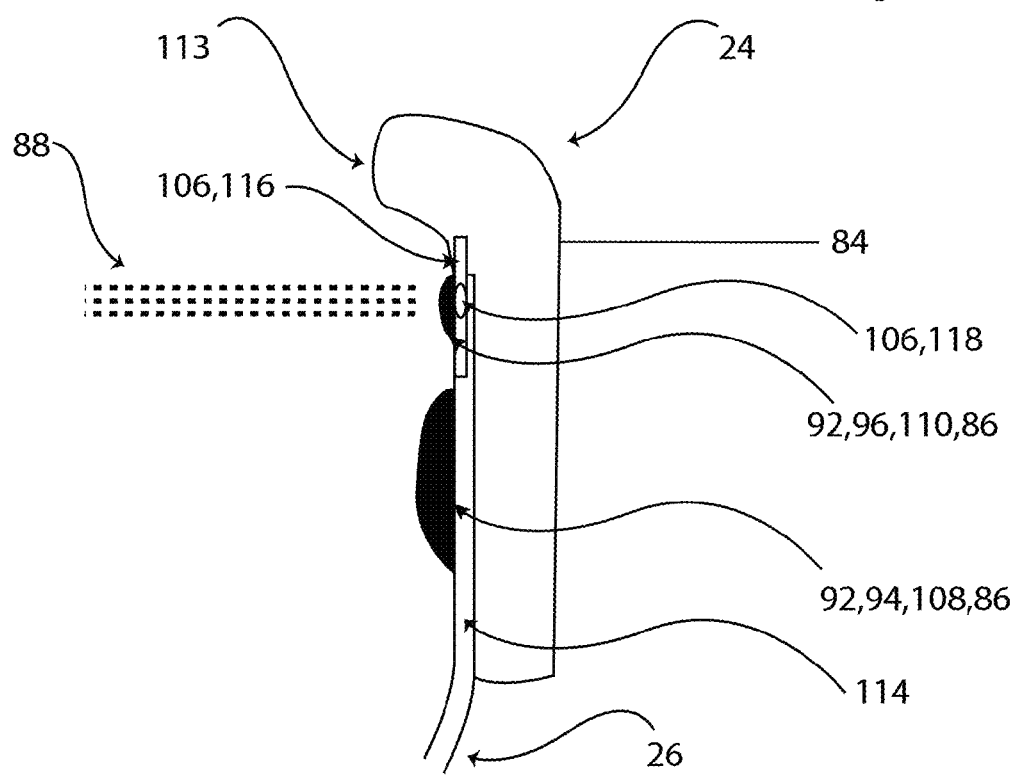
FIG. 17 is a cross sectional view of an embodiment of a movement activated unit which has been activated, thus facilitating outputting of a fluid from the glove.

Referring to FIG. 17, a same embodiment of the glove device 24 and movement activated unit 106 is shown where a user's fingers have been moved, creating an overhang 113. The movement activated unit 106 has been moved, thus aligning an aperture 118 so that fluid is outputted from the fluid reservoir 114 via at least one final fluid output apertures 86.

Similarly, fluid from a fluid reservoir 114 or from the connecting member 26 may be outputted from a main final fluid output point 108 utilising similar means, such as a depressible member that aligns an aperture with a fluid input point from a fluid source. When not depressed, the member may block access of a fluid to the main final fluid output point 108, thus not facilitating outputting of a fluid from the device 24.

These examples of how to output fluid from a fluid outputting glove device 24 via a pressure activated unit 102 and/or a movement activated unit 106 are given by way of example only and in no way limit the scope of the invention 10. There are many methods for outputting a fluid via pressure and/or movement activated units 102, 106, which will be obvious to those with skill in the art, and various modifications will be apparent without departing from the scope of the invention 10.

Preferably there are two independent mechanisms that facilitate distance spraying, and pressure activated fluid outputting. Preferably a main final fluid output point 108 and a secondary fluid output point 110 for spraying are separate. It is feasible that one mechanism and/or member could facilitate both, the member both facilitating outputting from a main final fluid outputting point 108 via pressure, and being moved and/or pressurized by movement of one or more fingers of a user, thus facilitating distance outputting.

Figure 18:
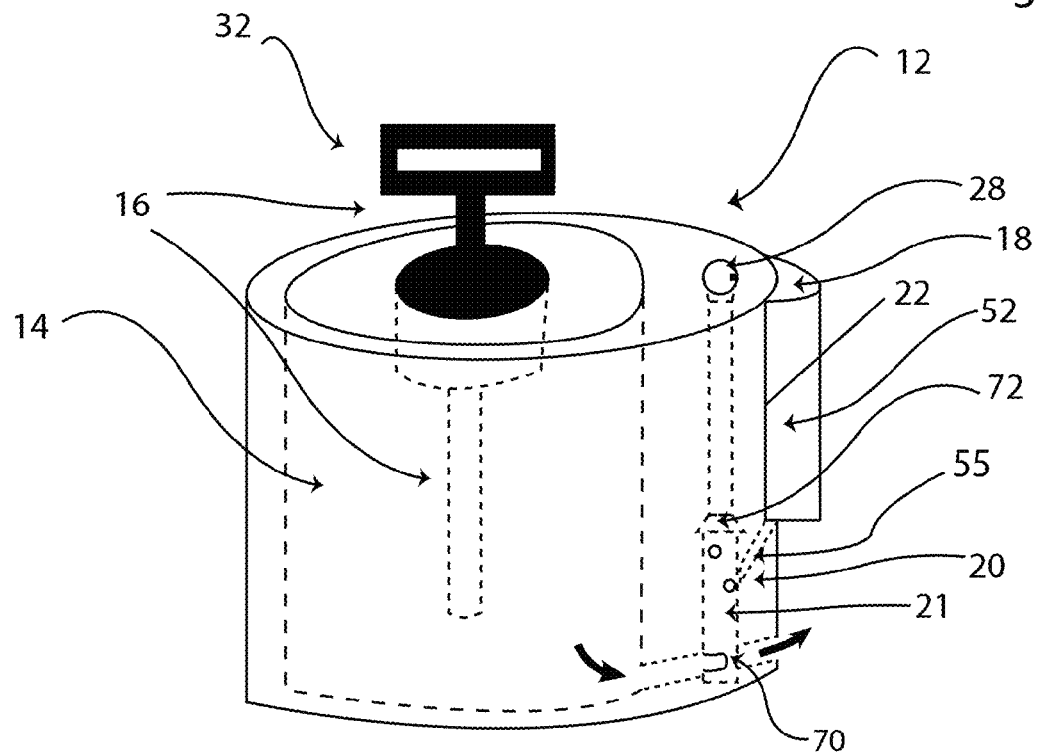
FIG. 18 is a perspective view of the housing of the station featuring a mix addition holding chamber that is on and about the station.
Figure 19:
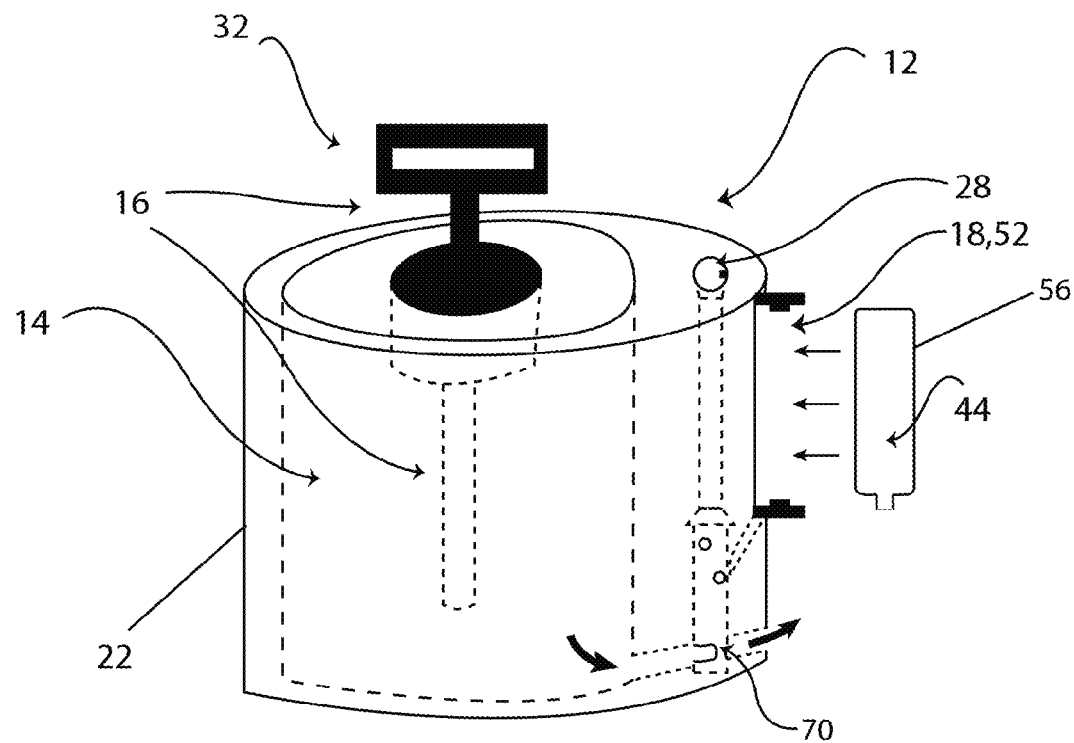
FIG. 19 is a perspective view of the housing of the station featuring a mix addition holding chamber housed on or about the station.

Referring to FIG. 18 and FIG. 19, there is shown an embodiment of the station where a mix addition holding chamber 18 is an integral part of the station 12, housed on or about the station 12. Referring to FIG. 19, a mix addition container 56 may be fixed into a chamber 18 substantially externally to the station 12.

Figure 20:
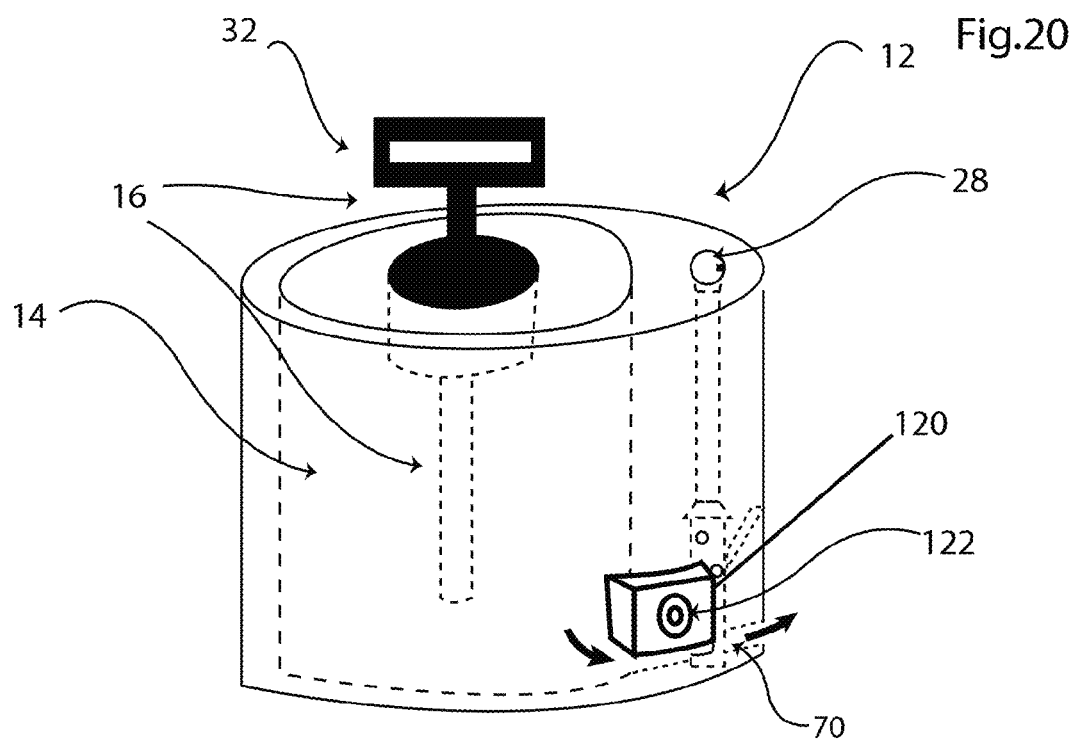
FIG. 20 is a perspective view of the station where there is provided an external fluid input receiver.
Figure 21:
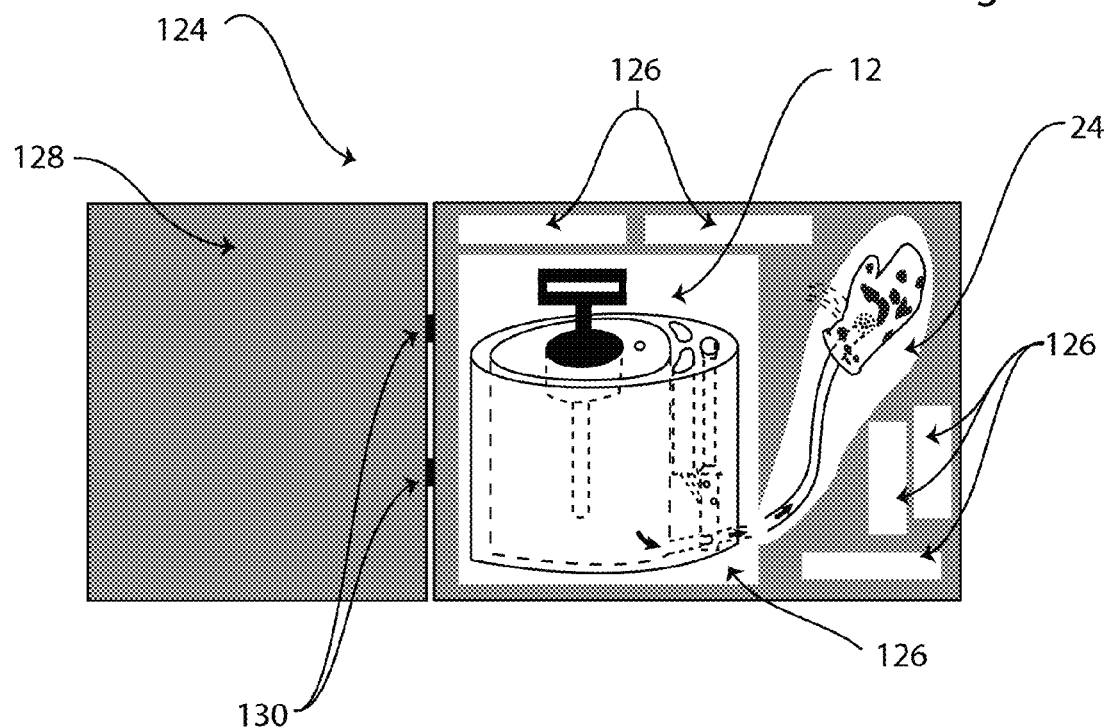
FIG. 21 shows a storage container for the pet cleaning apparatus.

Referring to FIG. 20, there is provided an embodiment of the station 12 where there is included an external fluid input receiver 120 which includes an external input connection point 122 so that an external fluid input source, such as a hose or a tap or the like, may be inputted into the station 12, the external fluid thus being inputted for mixing with one or any mix addition 44 via a valve 21 or any other fluid control and mix selecting system 20. It is feasible that the external fluid input receiver 120 may channel an external fluid into the fluid containment chamber 14 or directly into the mixing system 20 so that it by-passes the fluid containment chamber 14.

The pet cleaning apparatus 10 may be part of a wider apparatus for cleaning and training of a, preferably dog, pet, which may comprise a storage container 124, itself comprising at least one cavity 126, a lid 128 for closing the at least one cavity 126, and a pet cleaning apparatus 10 as aforementioned. There may be provided at least one hinge 130 for hinging of the storage container 124. There may be provided within the storage container 124 multiple cavities 126 for one or any of a towel, a mat, an expandable or self-expanding pet bathing pool, a nourishment for a pet, a bowl for feeding of a pet, a DVD for training of a pet, and a scanning port for scanning a media receiving device such as a smartphone or tablet device over. There may also be provided at least one cavities 126 for one or more mix additions 44 such as a shampoo or conditioner.

Figure 22:
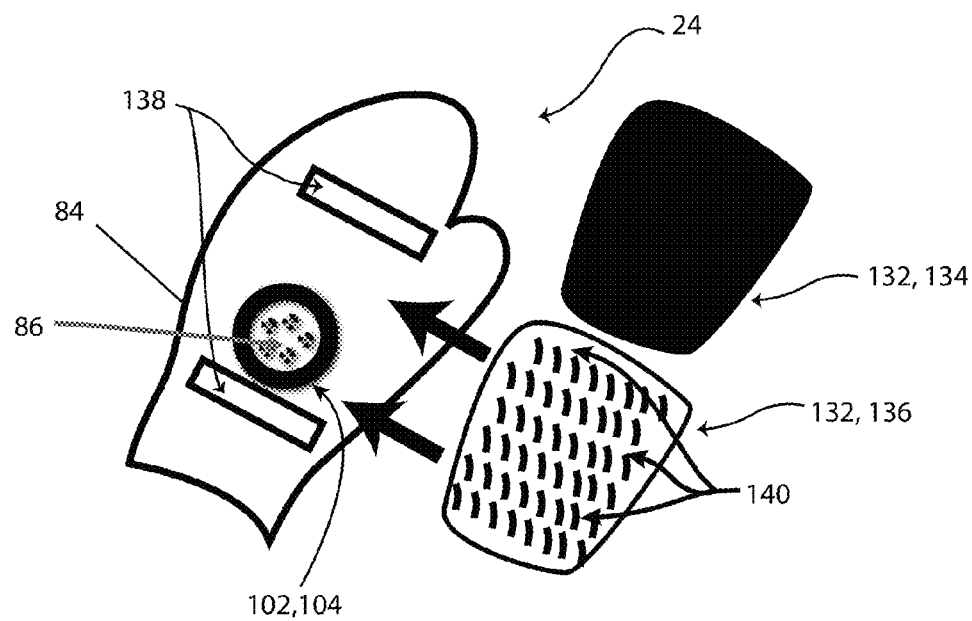
FIG. 22 is a perspective view of the glove device where a removable pad attachment is featured and may be removable so that a different pad attachment may be applied to the glove.

Referring to FIG. 22, there is provided an embodiment of the glove device 24 wherein a surface of the glove 24 is a removable pad attachment 132. There may be provided and/or usable a plurality of removable pad attachments 132 which may either be attachable in order to replace an old and similar pad attachment 132, or may be attachable being a pad attachment 132 configured, designed and/or surfaced to provide an alternate use. Referring to FIG. 22, there is shown a generic cleaning pad attachment 132,134 being replaced by a scrubbing and/or massaging pad attachment 132,136, which may be facilitated by a fixing element 138 provided about a palm of the device 24, although there are many ways of fixing a pad attachment 132 removably to a glove device 24 which will be obvious to those with skill in the art, and a fixing element 138 is given by way of example only and in no way limiting the scope of the invention 10. Thus it is feasible that a removable pad attachment 132 may be removed so that a pad attachment 132 with a differing surface, and therefore ability, may be attached by a user. Similarly, a pad attachment 132 that is worn and exhausted may be replaced by a new pad attachment, which may add longevity to a lifespan of the glove device 24.

The scrubbing and/or massaging pad attachment 132,136 may include bristles 140 that may be of plastics materials. There may be provided removable pad attachments 132 of any type and use, which will be obvious to those with skill in the art.

A pad attachment 132 may be permeable and/or may integrally include at least one cavity so that fluid may be outputted. Fluid output may be absorbed by the pad attachment 132 which may feasibly be beneficial in generating a surface for the glove which adequately cleans and does not divulge excessively large volumes of fluid upon a desired target.

The invention 10 will now be described in use by a user, with reference to a preferred embodiment which in no way limits the scope of the invention, with various modifications being apparent to those with skill in the art.

The apparatus is portably moved by a user to an area for cleaning of a pet, which may be within a house or outside.

Water, preferably warm, from a mains supply is inputted into the fluid containment chamber by a user.

The fluid containment chamber is pressurized by a user via a pressurizing mechanism, which may be a pump. The fluid control and mix delivery station may be placed on a floor by a user. At least one mix addition, such as a shampoo, conditioning agent, or treating agent may be slotted, poured and/or placed into a mix addition holding chamber for mixing with the water, or may already be present and previously locked in, so that the fluid output and mixing station is self-contained.

The mix addition may be a fluid, a gel, or a powder or any other material. If the mix addition is a non-contained fluid or powder, the mix holding chamber may be fully closable. If the mix addition is inputted in a container, it may be held in the station as a cartridge which may be removable and changeable.

A glove device is worn by a user on one hand and preferably covers a whole hand. The, preferably dog, pet is placed close to the user for cleaning. It is feasible that it is placed in a self-expandable pet cleaning bathing pool so that fluid is held in the pool during cleaning. The pet is held with both hands by a user, the user thus able to focus simultaneously on cleaning and preventing an escape.

The pet is petted by a user with the glove, which may or may not be outputting fluid. Pressure is placed on a surface of the pet's coat, which facilitates outputting of the water from a palm side of the glove device and onto a coat of the pet. This may be achieved via a pressure activated unit on the glove which opens a channel to a pressurized fluid outputted by the station, the fluid travelling through a connecting member that connects the station and the glove.

Preferably fluid is outputted slowly, with little sound, so that there is little loss of fluid and so that the pet is not enticed to shake its coat to dry it, or attempt to escape. It is feasible that a fluid output is not visually perceived by the pet.

Once the coat of the pet is wetted, a, preferably shampoo-based, lather may be introduced by the user to the pet by selecting a mix option from a manual selecting element, which is preferably located on a top facing side of the fluid control and mix delivery station so it is easily accessible and usable by a user. This provides simplicity and elegance of use. A mixing and/or control option may be chosen with one hand whilst another gloved hand cleans, holds and pets a pet.

After lathering of a pet, a rinsing option may be chosen via the manual selecting element on the self-contained fluid control and mix delivery station. The rinsing option may be water. Thus the coat of a pet can be wetted, shampooed and rinsed.

Another addition may be selected, such as a conditioner mix addition, or a coat and/or skin treating mix addition. Similarly, these may be applied to a pet with little or no breakage to a cleaning process. Selecting a mix addition on the manual selecting element, which is preferably a dial, opens one or more apertures which releases and/or induces mixing of the mixing agent with the, preferably water, fluid. Pressurized flow of water through the system may further induce a mix addition into the fluid, which may occur within a valve.

Whilst pressure is applied to a pet, fluid is outputted from the glove in the present preferred embodiment. When no pressure is applied, fluid is not outputted, thus saving fluid. An exception to this may be a movement activated unit on the glove, which when moved, facilitates spraying of a fluid output from a distance preferably by movement of an aperture which facilitates flow of a fluid to a final fluid output point on the glove. In this way, if there is a particularly troublesome area for cleaning on the pet, a fluid, which may be water or water mixed with an addition, may be fired from the glove by movement of one or more digits. This variable output option greatly enhances the cleaning process and is intuitive.

A further option for cleaning is use of a scrubbing/massaging surface. Once a pet has been wetted and a, preferably shampoo-based, lather has been built up, a scrubbing surface that may be located about a finger-tip position on the glove may be used to capitalise upon the lather to further scrub and clean the pet. Because the fluid output may be pressure-activated, this is particularly beneficial as a user may choose to gently arch their fingers, therefore releasing pressure on the surface of the glove and hence the pressure activated unit. Thus lather may be scrubbed without a fluid output from the glove.

Similarly a treating agent mix addition may be added and applied to a pet, may be scrubbed, and may be rinsed, without any halting of the cleaning process.

After cleaning, the pet may be placed on a mat and may be dried with a towel. Nourishment may be given to the pet which may also function as training. The nourishment may be placed in a bowl, which may be included as part of a wider pet cleaning apparatus and set.

The present pet cleaning apparatus may be placed into a storage container so that it can be easily stored, transported and rapidly deployed. The apparatus is self-contained and transportable and requires no wearing of any apparatus by the user, save the glove device. Other elements of a pet cleaning and training apparatus may be stored in the storage container, which may be of lightweight plastics, thus easily transportable and cleanable. All textile elements may be washable. The glove device may also be used to clean other parts of the apparatus.

If a self-expanding bathing pool has been utilised, it may include an output point so that fluid can easily be drained out, and/or it may include a low lip so fluid can be easily drained from the pool.

The above description of the apparatus in use by a user is given by way of example only, in no way limiting the scope of the invention.

The station may feature a connection point so that fluid from a mains supply can be used as the fluid input, bypassing the fluid containment chamber. A possible fluid input may be a garden hose/tap water supply. Another possible fluid input source may be from a tap via a double tap attachment that is commonly used by house owners to spray bath tap water from a shower head.

The glove may be detachable from the station and/or connecting member so that it can be used in isolation and from another fluid source.

It is feasible that a second glove device may be provided for wearing.

It is feasible that the apparatus may feature a purge cycle, whereby an addition can be purged fully from the fluid output via a purging cycle.

Referring to FIG. 18 and FIG. 19, there is shown an embodiment of the station where the mix addition holding chamber is an integral part of the station, housed on or about the station. In FIG. 19, a mix addition container 56 may be fixed into a chamber substantially externally to the station.

The fluid control and mix delivery station is an all-in-one independent solution to cleaning and treating of a pet. The design is elegant and self-contained, thus transportable. It is extremely compact and easily reloadable. It does not require wearing. Because it has its own pressurizing mechanism, it does not rely on gravity and therefore can be placed in any location during cleaning. In conjunction with a pet cleaning pool, it opens up a possibility of petting and cleaning a pet inside of a house, and of greatly enhancing the cleaning process in any location. In a preferred embodiment, a shampoo container may be locked into the station so that it acts as a cartridge. Thus an exhausted mix addition may be replaced with a new one, which may be purchased separately or with the apparatus.

Multiple additions may be conveniently housed in the station for mixing, not limited in number.

The manual selecting element, which may be a turn-dial, means that a pet can be cleaned with no interruption, which lessens chance of an attempted escape by the pet.

The main final fluid output point may be designed so that a relatively small but effective flow of fluid is outputted onto the pet for effective cleaning with little or no fluid wastage.

The glove is preferably of a mitt shape and is extremely comfortable to wear.

Mixing of the mix addition with the fluid is preferably achieved internally as the station is self-contained, and thus the mixing and any valves and/or connecting tubes for mixing may be housed internally, thus unseen by a user, which is preferable. This creates an extremely simple experience for cleaning of a pet.

A preferable pressure activated unit on the glove saves significant volumes of water as fluid may only be outputted once pressure is applied to a desired surface, which is intuitive. A preferable secondary spray option, which allows fluid to be sprayed at a target from a distance, allows a problematic area for cleaning to be targeted by a user, preferably by moving of one or more digits, which is intuitive and adds effectiveness and enjoyment to the cleaning process.

A third option for cleaning may be a scrubbing surface about a palm of the glove device, which may be located about a finger-tip location of the glove, and may comprise nodules, protrusions, and/or a raised surface so that a pet can be scrubbed and/or massaged by a user. This may be achieved during fluid output from the glove, or without fluid outputting halted by arching of a hand so that a pressure activated unit is not pressurized.

The apparatus facilitates a most intuitive, elegant, and efficient way of cleaning a, preferably dog, pet. A user can concentrate solely on the cleaning of a dog, without many of the problems associated with the present art. The fully independent and self-contained nature of the station results in an experience where the user can focus solely on the glove and cleaning, and improve the cleaning experience both for the user and the dog.

It is feasible that the invention may be used in a zoological setting, such as cleaning of an animal in a zoo, or cleaning of any animal that is owned, which could therefore be said to be a pet.

Dog owners do not want to use bladder bags or unwieldy methods for cleaning of a dog. They want an all in one solution that includes shampooing and preferably conditioning and treating of a dog coat so that the dog is happy and clean, without problems such as ineffective cleaning, misdirected fluid outputting, and attempted escapes from the dog. The portable lightweight self-contained pre-pressurizable fluid control and mix delivery station, in conjunction with the, preferably multiple variable output options, glove device, allows a user to solve these problems.

The invention can be used in any location, inside and out, and is easily transportable, preferably via a storage container, so that it can be taken to a location where a cleaning of a dog may be required.

The embodiments described above are provided by way of example only, and various other modifications will be apparent to persons skilled in the art without departing from the scope of the invention as described in the appended claims.

The invention claimed is:

1. A pet cleaning apparatus, comprising:
   a portable lightweight all-in-one self-contained pre-pressurizable mixing and fluid outputting station, the station itself comprising:
      a housing;
      a fluid containment chamber for containing fluid; and
      a pressurizing mechanism to facilitate pressurized outputting of the fluid from the station,
   the station configured to hold at least one mix addition for mixing, and further comprising a mixing and selecting system, the mixing and selecting system itself comprising:
      a mixing system configured to facilitate mixing of the at least one mix addition with the fluid from the fluid containment chamber; and
      a manual selecting element to facilitate choosing by a user of mix, and thus output, options from the station;
   a glove device, the glove device itself comprising:
      a wearable housing, wearable about a hand of a user; and
      at least one fluid output point located about a palm of the device;

wherein the apparatus is configured to provide a plurality of fluid output options for a user, the options comprising:
pressure-activated outputting of fluid from the glove device, so that fluid can be outputted onto a coat of a pet when pressure is applied to the coat of the pet with the glove device; and
selectable distance outputting of fluid, so that fluid can be outputted from the glove device at a pet, from a distance,
and a connecting member to connect the station and the glove device so that pressurized fluid outputted from the station may be connectably outputted from the at least one fluid output point about the palm of the glove device.

2. A pet cleaning apparatus as claimed in claim 1, wherein the station comprises at least one mix addition holding chamber for holding a said mix addition.

3. A pet cleaning apparatus as claimed in claim 2, wherein the mix addition holding chamber is configured to hold a mix addition container.

4. A pet cleaning apparatus as claimed in claim 3, wherein the station is configured so that the mix addition container is fixable to the mix addition holding chamber substantially externally to the station, in a substantially unenclosed manner.

5. A pet cleaning apparatus as claimed in claim 3, wherein a dimension of an opening of the mix addition holding chamber matches a circumferential shape of the mix addition container, the container thus slotting into the mix addition holding chamber for mixing.

6. A pet cleaning apparatus as claimed in claim 5, wherein there is provided a fixing mechanism for the mix addition holding chamber, the fixing mechanism comprising:
at least one spring element on a floor of the mix addition holding chamber; and
at least one fixing member for holding the mix addition container within the mix addition holding chamber,
the station thus substantially providing a cartridge-based system whereby the mix addition container can be locked in to the mix addition holding chamber via the at least one fixing member, and spring-loadedly ejected via the at least one spring element, the at least one spring element upwardly pushing a portion of the mix addition container out of the mix addition holding chamber when it is not held by the at least one fixing member, so that it can be removed by a user.

7. A pet cleaning apparatus as claimed in claim 6, wherein the mix addition holding chamber comprises an opening on a top of the station, mix addition container insertable downwardsly into the station via the mix addition holding chamber opening on the top of the station.

8. A pet cleaning apparatus as claimed in claim 3, wherein the mix addition holding chamber is configured so that a mix addition container is downwardly insertable into the mix addition holding chamber, and is spring-loadedly upwardly releasable from the holding chamber.

9. A pet cleaning apparatus as claimed in claim 2, wherein the mix addition is at least one of:
pet shampoo;
pet conditioner;
pet treating agent.

10. A pet cleaning apparatus as claimed in claim 1, wherein the station comprises two mix addition holding chambers for holding two separate mix additions.

11. A pet cleaning apparatus as claimed in claim 1, wherein the pressurizing mechanism comprises a hand pump.

12. A pet cleaning apparatus as claimed in claim 1, wherein the glove device is configured such that distance outputting of fluid is initiated via digit movement of a user whilst wearing the glove device.

13. A pet cleaning apparatus as claimed in claim 1, wherein the glove device comprises a pressure activated mechanism, wherein a portion or a whole of the pressure activated mechanism is provided about a palm area of the glove device.

14. A pet cleaning apparatus as claimed in claim 1, wherein the glove device is configured such that pressure-activated outputting of fluid via pressure to a coat of a pet is outputted from the said fluid output point of the glove device, and the glove device further comprises at least one different fluid output point used for distance outputting of fluid.

15. A pet cleaning apparatus as claimed in claim 1, wherein the glove device is configured such that pressure-activated outputting of fluid is outputted from the said fluid output point of the glove device, and distance outputting of fluid is outputted from the same said fluid output point of the glove device.

16. A pet cleaning apparatus as claimed in claim 1, wherein a front portion of the glove device fully covers a hand of a user, when worn.

17. A pet cleaning apparatus as claimed in claim 1, wherein the glove device fully covers a hand of a user when worn.

18. A pet cleaning apparatus as claimed in claim 1, wherein the mixing system is internal to the station.

19. A pet cleaning apparatus, comprising:
a portable, lightweight fluid containment chamber for containing fluid;
a pressurizing mechanism to facilitate pressurized outputting of the fluid from the fluid containment chamber;
a mixing and selecting system, the mixing and selecting system itself comprising:
a mixing system configured to facilitate mixing of at least one mix addition with the fluid from the fluid containment chamber; and
a manual selecting element to facilitate choosing by a user of mix, and thus output, options from the station;
a glove device that partially or fully covers a hand of a user, the glove device comprising a fluid output point, and being configured both for pressure-activated outputting of fluid so that fluid can be outputted onto a coat of a pet when pressure is applied to the coat of the pet with the glove device, and also for selectable distance outputting of fluid so that fluid can be outputted from the glove device at a pet, from a distance;
and a connecting member so that fluid from the fluid containment chamber can be outputted from the glove device.

20. A pet cleaning apparatus, comprising:
a portable lightweight all-in-one station, the station itself comprising:
a housing;
a fluid containment chamber for containing fluid; and
a pressurizing mechanism to facilitate pressurized outputting of the fluid from the station,
the station configured to hold at least one mix addition for mixing, and further comprising a mixing and selecting system, the mixing and selecting system itself comprising:

a mixing system configured to facilitate mixing of the at least one mix addition with the fluid from the fluid containment chamber; and a manual selecting element to facilitate choosing by a user of mix, and thus output, options from the station;

a glove device shaped to partially or fully cover a hand of a user, and comprising a fluid output point, wherein the glove device is mechanically arranged to facilitate both:

pressure-activated outputting of fluid from the glove device, so that fluid can be outputted onto a coat of a pet when pressure is applied to the coat of the pet with the glove device; and selectable distance outputting of fluid from the glove device, so that fluid can be outputted at a pet, from a distance;

and a connecting member to so that fluid from the fluid containment chamber can be outputted from the glove device.

21. A pet cleaning apparatus, comprising:

a portable lightweight fluid containment chamber for containing fluid;

a pressurizing mechanism to facilitate pressurized outputting of fluid;

a hand-wearable fluid outputting device, configured to provide a fluid output option such that when a user applies pressure to a coat of a pet with a palm side of the user's hand whilst wearing the device, fluid is outputted onto the coat of the pet; and a connecting member, so that fluid from the containment chamber can be outputted from the hand-wearable fluid outputting device;

wherein the pet cleaning apparatus also provides selectable distance outputting of fluid, so that fluid can be outputted from the hand-wearable fluid outputting device at a pet, from a distance.

22. A pet cleaning apparatus as claimed in claim 21, wherein the apparatus is configured to hold at least one mix addition for mixing, and further comprises a mixing and selecting system, the mixing and selecting system itself comprising:

a mixing system configured to facilitate mixing of the at least one mix addition with the fluid from the fluid containment chamber; and a manual selecting element to facilitate choosing by a user of mix, and thus output, options from the station.

23. A pet cleaning apparatus as claimed in claim 22, wherein the hand-wearable fluid outputting device is configured such that distance outputting of fluid is initiated via digit movement of a user whilst wearing the device.

* * * * *